(12) United States Patent
Fighel

(10) Patent No.: US 11,556,871 B2
(45) Date of Patent: Jan. 17, 2023

(54) SYSTEMS AND METHODS FOR ESCALATION POLICY ACTIVATION

(71) Applicant: New Relic, Inc., San Francisco, CA (US)

(72) Inventor: Guy Fighel, San Francisco, CA (US)

(73) Assignee: New Relic, Inc., San Francisco, CA (US)

( * ) Notice: Subject to any disclaimer, the term of this patent is extended or adjusted under 35 U.S.C. 154(b) by 58 days.

(21) Appl. No.: 17/105,871

(22) Filed: Nov. 27, 2020

(65) Prior Publication Data

US 2021/0081879 A1    Mar. 18, 2021

Related U.S. Application Data

(63) Continuation-in-part of application No. 16/664,007, filed on Oct. 25, 2019, and a continuation-in-part of application No. 15/334,928, filed on Oct. 26, 2016, now abandoned.

(60) Provisional application No. 62/750,683, filed on Oct. 25, 2018.

(51) Int. Cl.
    *G06Q 10/06*    (2012.01)
    *G06F 11/07*    (2006.01)

(52) U.S. Cl.
    CPC .. *G06Q 10/063112* (2013.01); *G06F 11/0781* (2013.01)

(58) Field of Classification Search
    CPC .................. G06Q 10/063112; G06F 11/0781
    See application file for complete search history.

(56) References Cited

U.S. PATENT DOCUMENTS

| | | | |
|---|---|---|---|
| 5,528,759 A | 6/1996 | Moore | |
| 5,917,726 A | 6/1999 | Pryor | |
| 6,012,152 A | 1/2000 | Douik | |
| 6,735,484 B1 | 5/2004 | Lenz | |
| 6,970,758 B1 | 11/2005 | Shi et al. | |
| 10,387,899 B2 | 8/2019 | Fighel | |
| 2006/0047561 A1 | 3/2006 | Bolton | |
| 2006/0112093 A1 | 5/2006 | Lightstone et al. | |
| 2007/0083409 A1 | 4/2007 | Dilbeck et al. | |
| 2007/0094228 A1* | 4/2007 | Nevin | G06Q 10/06 706/60 |
| 2007/0203778 A1* | 8/2007 | Lowson | G06Q 10/06316 705/7.14 |
| 2008/0140469 A1 | 6/2008 | Iqbal et al. | |
| 2008/0263626 A1 | 10/2008 | Bainter et al. | |
| 2009/0119147 A1* | 5/2009 | Messer | G06Q 10/063112 705/7.14 |
| 2010/0094981 A1 | 4/2010 | Cordray et al. | |
| 2010/0235368 A1 | 9/2010 | Bhattacharya et al. | |

(Continued)

*Primary Examiner* — David R Lazaro
(74) *Attorney, Agent, or Firm* — FisherBroyles, LLP

(57) ABSTRACT

A production environment monitoring system notes when problems or issues arise in a computer-based production environment. A noted problem or issue can trigger an escalation policy that calls for notifying an individual identified in the escalation policy to ask the individual to resolve or mitigate the problem or issue. The notification sent to the individual identified in the escalation policy also includes information about one or more individuals that are knowledgeable about the problem or issue that triggered the escalation policy and that may be able to provide assistance in resolving or mitigating the problem or issue.

18 Claims, 11 Drawing Sheets

(56) References Cited

U.S. PATENT DOCUMENTS

| | | |
|---|---|---|
| 2012/0065932 A1* | 3/2012 | Catipon, Jr. ......... G06Q 10/109 |
| | | 702/178 |
| 2013/0046764 A1 | 2/2013 | Choi et al. |
| 2013/0139179 A1 | 5/2013 | Roll |
| 2013/0304897 A1 | 11/2013 | Suri et al. |
| 2014/0129536 A1 | 5/2014 | Anand et al. |
| 2015/0281253 A1 | 10/2015 | Lords et al. |
| 2016/0028645 A1 | 1/2016 | Hohn et al. |
| 2016/0301562 A1 | 10/2016 | Hirsch |
| 2016/0315822 A1 | 10/2016 | Anderson et al. |
| 2016/0379119 A1 | 12/2016 | Kumar et al. |
| 2017/0168914 A1 | 6/2017 | Altman et al. |
| 2018/0075397 A1 | 3/2018 | Ronen et al. |
| 2018/0114234 A1 | 4/2018 | Fighel |
| 2018/0115464 A1 | 4/2018 | Fighel |
| 2018/0285798 A1 | 10/2018 | Kearns et al. |
| 2018/0288736 A1 | 10/2018 | Raman et al. |
| 2019/0041844 A1 | 2/2019 | Cella et al. |
| 2019/0097909 A1 | 3/2019 | Puri et al. |
| 2019/0173898 A1 | 6/2019 | Bharrat et al. |
| 2019/0190936 A1 | 6/2019 | Thomas et al. |
| 2020/0134528 A1* | 4/2020 | Fighel .............. G06Q 10/06316 |
| 2021/0081879 A1* | 3/2021 | Fighel ............ G06Q 10/063112 |
| 2021/0092029 A1* | 3/2021 | Kumar ................ H04L 41/0631 |

\* cited by examiner

SYSTEMS AND METHODS FOR ESCALATION POLICY ACTIVATION

This application is a continuation-in-part of U.S. application Ser. No. 16/664,007, filed Oct. 25, 2019, which itself claims priority to the filing date of U.S. Provisional Patent Application No. 62/750,683, filed Oct. 25, 2018, the contents of both of which are hereby incorporated by reference. This application is also a continuation-in-part of application Ser. No. 15/334,928, filed Oct. 26, 2016, the contents of which are also incorporated by reference.

BACKGROUND

The present application discloses technology which is used to help a business keep a computer based production environment operating efficiently and with good performance. The "production environment" could be any of many different things. In some instances, the production environment could be a networked system of computer servers that are used to run an online retailing operation. In another instance, the production environment could be a computer system used to generate computer software applications. In still other embodiments, the production environment could be a computer controlled manufacturing system. Virtually any sort of production environment that relies upon computers, computer software and/or computer networks could benefit from the systems and methods disclosed in this application.

Many software applications that monitor a computer-based production environment are configured such that when the software application detects a problem or issue in a production environment, the software application sends a notification to an appropriate system administrator or technician to alert them as to the problem or issue. The notified administrator or technician can then attempt to resolve or mitigate the problem or issue. The process that results in the software application notifying a system administrator or technician of a problem or issue is generally referred to as an "escalation policy." Detecting the problem or issue triggers the escalation policy.

In some instances, a single event that is indicative of a problem or issue in a production environment can trigger the activation of multiple escalation policies, each of which calls for notification of a different individual. When this occurs, often two or more individuals end up trying to solve the same basic problem. Depending on how the system is configured, each alerted individual may be unaware that other individuals have been contacted, and that other individuals are also trying to solve the same problem. At a minimum, this can result in duplication of effort. Even worse, activity on the part of a first individual trying to solve the problem may interfere with activity of a second individual who is also trying to solve the problem.

In addition, when an escalation policy is triggered, the escalation policy is typically designed to send an alert notification to a specific client, system administrator and/or technician. Unfortunately, the notified individual may not have the experience or knowledge necessary to address the problem that triggered the escalation policy. In those instances, the notified individual can seek help from other individuals that are more knowledgeable about the problem or issue that triggered the escalation policy. However, it is often difficult for the notified individual to easily locate another person who is knowledgeable about the problem or issue that triggered the escalation policy.

T

DETAILED DESCRIPTION

Figure 1:
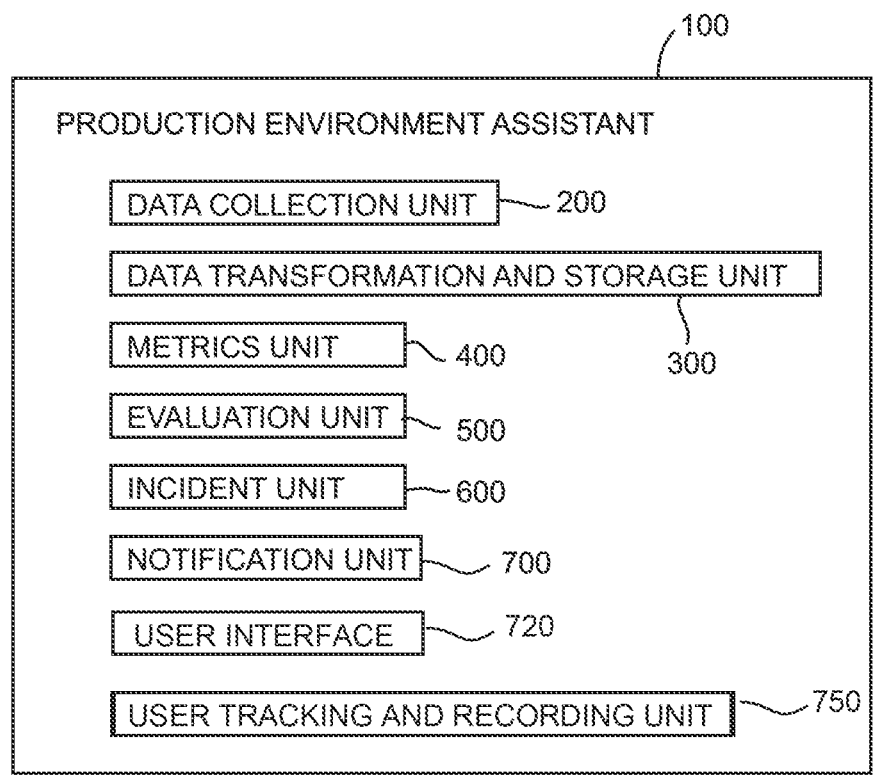
FIG. 1 is a block diagram illustrating various elements of a production environment assistant.

FIG. 1 illustrates various elements of a production environment assistant 100 which receives or obtains data from a client's production environment, which analyzes that data to determine whether problems of issues may be occurring within the production environment, and which reports on any identified problems or issues. Details of a production environment assistant 100 can be found in U.S. patent application Ser. No. 15/822,725, filed Nov. 27, 2017, which issued as U.S. Pat. No. 10,387,899, the contents of which are hereby incorporated by reference.

The production environment assistant 100 includes a data collection unit 200 which is responsible for receiving or obtaining data from a client's production environment. The data collection unit 200 would typically receive data via application programming interfaces (APIs) which have been installed and configured on the client's systems. The APIs would be configured to automatically send certain types of data to the data collection unit 200 on a periodic or continuous basis. The data being sent by the APIs to the data collection unit 200 could include data points representative of various measurements of a client's production environment, as well as event data relating to events which have occurred on the client's production environment.

The data could relate to operations performed by computer applications or programs, to the computer systems and networks themselves, and also other data related to the client's business. For example, the data being reported to the data collection unit 200 could include statistical data or information relating to business activity occurring on the client production environment, such as information relating to sales or usage of the client's production environment. Virtually any type of data relevant to a client's production environment could be reported to the data collection unit 200 via one or more APIs installed on the client's systems.

The production environment assistant 100 also includes a data transformation and storage unit 300. The data transformation and storage unit 300 receives data from a client's production environment, and transforms and enriches the data and loads that data into a data queue. The data transformation and storage unit 300 could also act to store received or obtained client data into one or more data repositories.

The production environment assistant 100 also includes a metrics unit 400. The metrics unit 400 receives or acquires data relating to a client's production environment, and then calculates various metrics using that raw data. Such calculations can include (but are not limited to) different statistical equations and algorithms, as well as outlier and anomaly algorithms. The metrics data is then stored in a metrics repository.

The production environment assistant 100 further includes an evaluation unit 500. The evaluation unit obtains or acquires data relating to a client's production environment and analyzes the data to determine if a pre-defined incident has occurred or is occurring on the client's production environment. The evaluation unit 500 could apply traditional analysis techniques, as well as artificial intelligence based analysis techniques.

The production environment assistant 100 also includes an incident unit 600. The incident unit 600 is notified by the evaluation unit whenever a pre-defined incident is determined to have occurred. Such incidents are stored in an incident database, which can be searched via a query unit.

The production environment assistant 100 further includes a notification unit 700, which reports incidents to clients, system administrators and technicians to alert them as to the occurrence of a problem or issue within a client's production environment. The notification unit 700 can act through various different communication channels to deliver a notification to a client, a system administrator or a technician so that the contacted individual can try to resolve or mitigate the problem or issue.

The production environment assistant 100 also includes a user interface 720 that allows users to obtain information from the production environment assistant 100 about how a computer-based production environment is performing. This can include access to various performance metrics, information about reported issues or problems and access to reports detailing the performance and overall health of a computer-based production environment. The user interface 720 could also be used to control and direct how the production environment assistant 100 monitors and reports on the performance and health of a computer-based production environment. The user interface 720 may also allow a client, a system administrator or a technician to take corrective action to mitigate or cure a problem or issue in a computer-based production environment.

The production environment assistant 100 further includes a user tracking and recording unit 750 that is configured to monitor how individual users interact with the production environment assistant 100. As will be explained in more detail below, the user tracking and recording unit 750 may also use information about how individual users are interacting with the production environment assistant 100 to generate one or more proficiency scores for each user that are indicative of a user's proficiency with respect to common issues that could arise in a computer-based production environment and with respect to features of the production environment assistant 100 itself.

Each of the above discussed elements of the production environment assistant 100 are discussed in more detail below. In addition, FIGS. 9-12 illustrate the steps of methods that would be performed by the elements of the production environment assistant 100 to activate an escalation policy and/or coordinate the activation of multiple escalation policies to alert a client, system administrators or technicians when the production environment assistant 100 determines that an issue or problem has arisen within a client's production environment.

Figure 2:
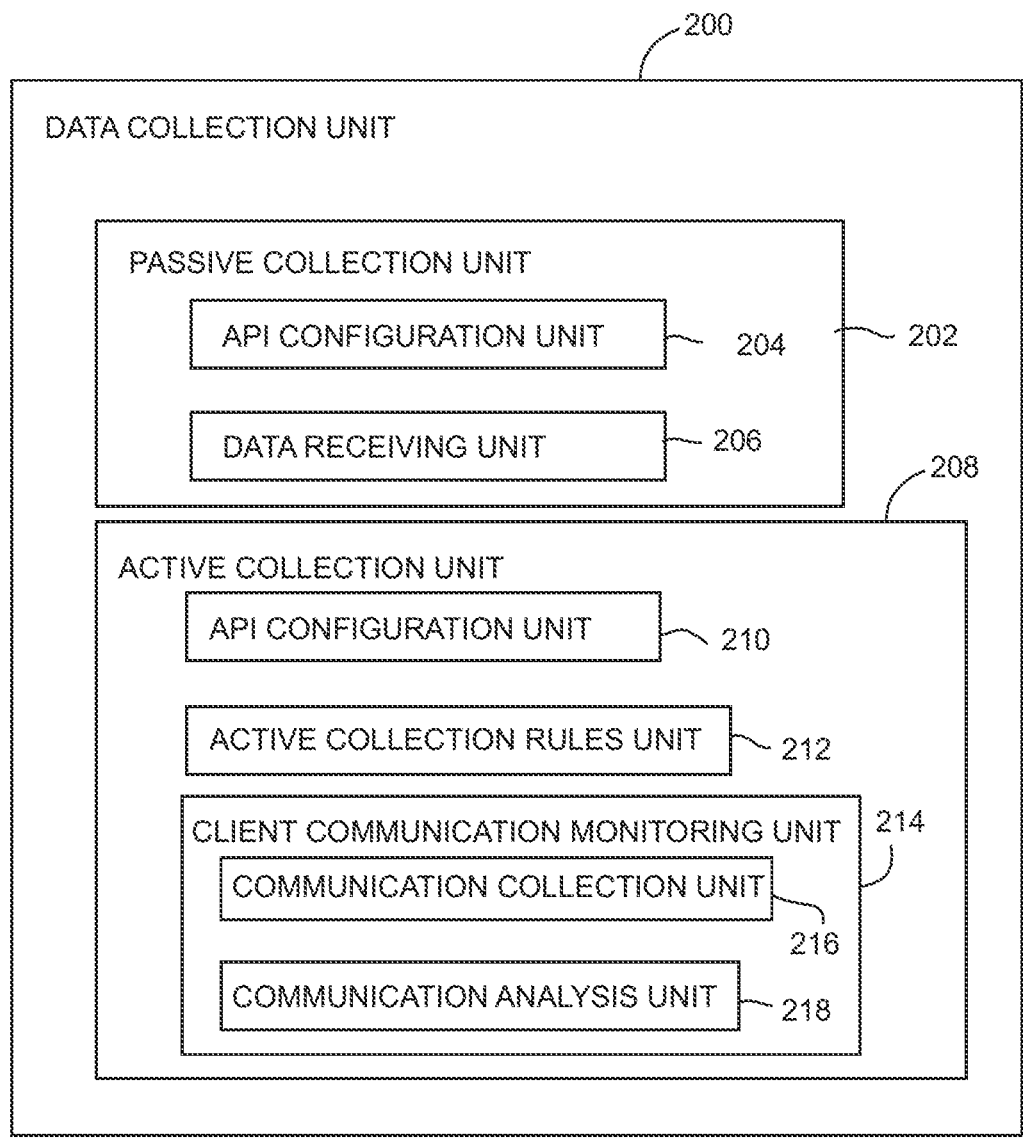
FIG. 2 is a block diagram illustrating various elements of a data collection unit.
Figure 3:
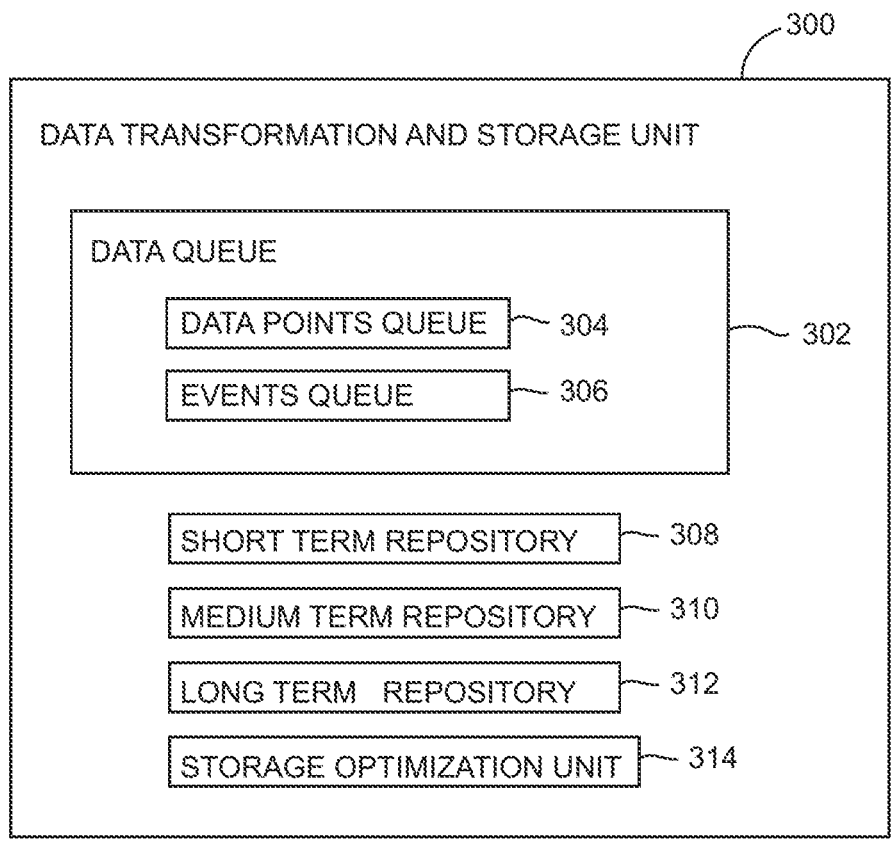
FIG. 3 is a block diagram illustrating various elements of a data collection and transformation unit.
Figure 4:
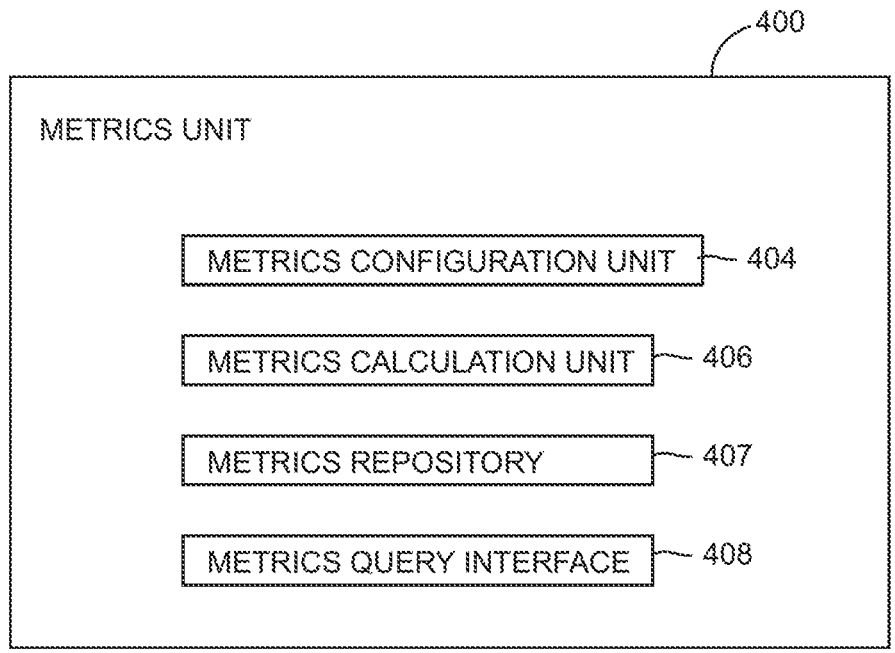
FIG. 4 is a block diagram illustrating various elements of a metrics unit.
Figure 5:
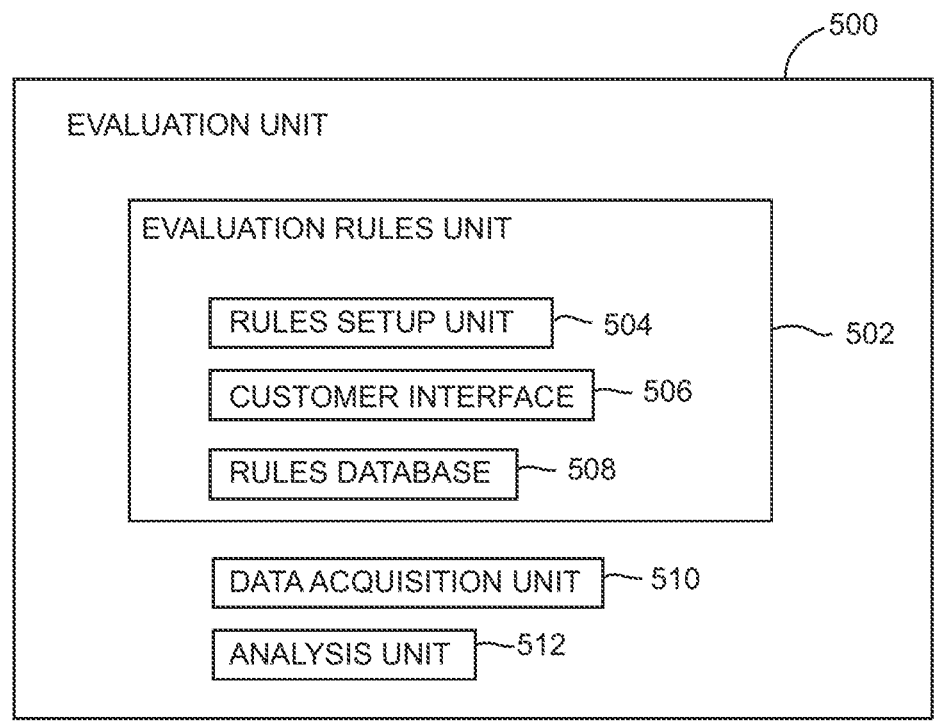
FIG. 5 is a block diagram illustrating various elements of an evaluation unit.
Figure 6:
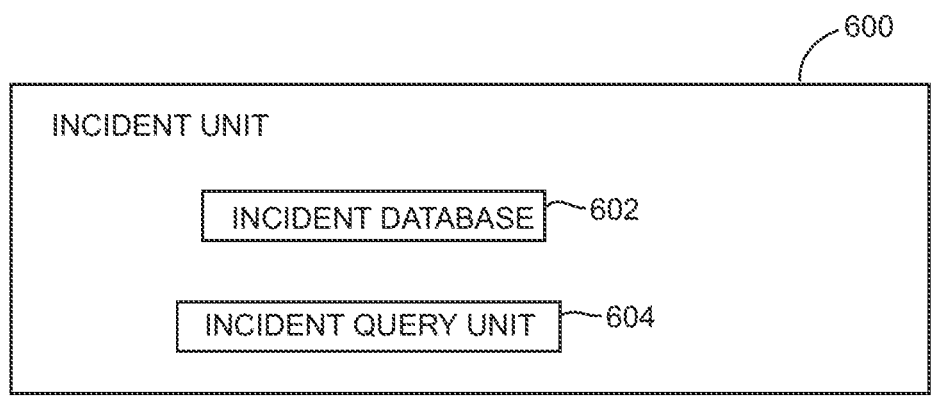
FIG. 6 is a block diagram illustrating various elements of an incident unit.
Figure 7:
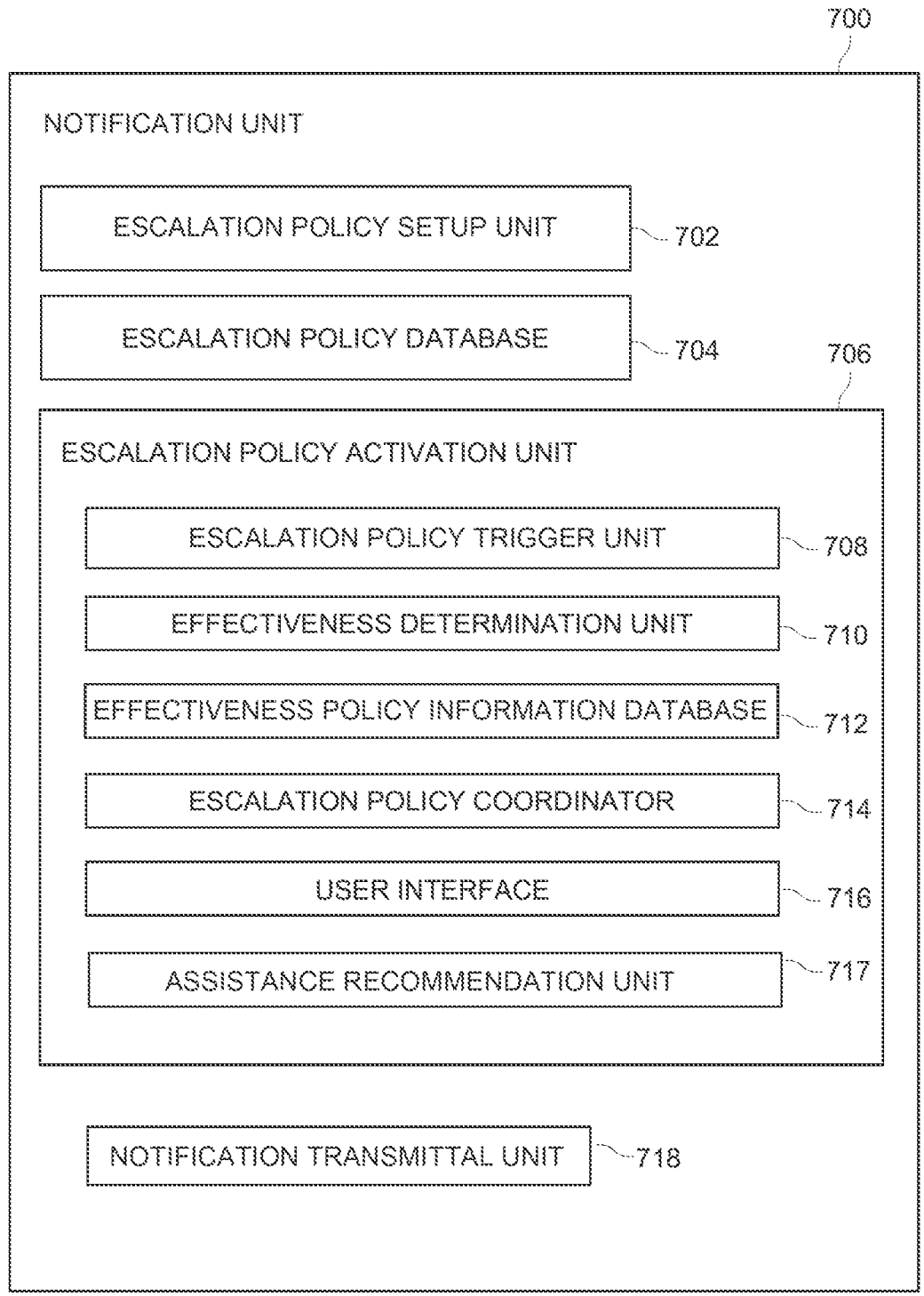
FIG. 7 is a block diagram illustrating various elements of a notification unit.

FIG. 2 illustrates various elements of a data collection unit 200 which can be part of a production environment assistant 100. The data collection unit 200 includes a passive collection unit 202, which receives data reported from the various systems of a client's production environment. The data reported to the passive collection unit 202 may be reported via various APIs that are installed in the client's production environment. Alternatively, or in addition, a dedicated agent could be installed on client servers or networking equipment. Such an agent could utilize the one or more separate API collection methods. The APIs are configured to periodically or continuously report various items of information regarding operations on the client's production environment.

The passive collection unit 202 can include an API configuration unit 204, which can be used to help configure the various APIs that are installed on a client's production environment. In particular, the API configuration unit 204 can be used to provide one or more client-specific encryption codes, tokens or keys to the APIs installed within a client's production environment. The APIs then include this encryption code, token or key with the data they report to the passive collection unit 202.

The passive collection unit 202 also includes a data receiving unit 206, which actually receives the data reported from the APIs installed on a client's production environment. The data receiving unit 206 checks the received data to ensure that it includes an appropriate client-specific encryption key, token or code. If so, the data receiving unit 206 accepts the received data. If the received data does not include an appropriate encryption code, token or key, then the data receiving unit ignores the received data. This makes it very difficult for a malicious third party to spoof artificial and/or incorrect data. The client-specific encryption code, token or key may also act to identify received data as originating from a particular client.

The data collection unit 200 can also include an active collection unit 208. The active collection unit 208 actively seeks out and obtains particular items of information from a client's production environment by sending requests for such data to the APIs installed within a client's production environment. The active collection unit 208 can include an API configuration unit 210 which is used to help configure the APIs installed within a client's production environment so that they will respond to such requests. This can include providing the APIs within a client's production environment with various encryption keys or codes which must be used by the active collection unit 208 in order to obtain information about a client's production environment from those APIs. In other words, the active collection unit 208 may need to provide an encryption key or code to the APIs within a client's production environment in order to obtain data from those APIs. The API configuration unit 210 helps to establish the encryption key or codes which will be used by the active collection unit 208 to obtain information from the APIs within a client's production environment.

The active collection unit 208 can also include an active collection rules unit 212. The active collection rules unit 212 allows a system administrator or a client to set up predefined rules which will determine when and how the active collection unit 208 seeks out information from a client's production environment. Once such rules have been established, the active collection unit 208 acts to follow the rules.

The active collection unit 208 can further include a client communication monitoring unit 214. The client communication monitoring unit 214 can include a communication collection unit 216 which monitors communications which are generated by or received by various individuals employed by or associated with a particular client. This can include collecting copies of email messages, text messages, instant messages, other forms of written communications, as well as copies of audio communications passing between certain individuals. A communication analysis unit 218 then analyzes the client communications collected by the communication collection unit 216 to help determine whether certain activity is occurring within a client's system or production environment.

The goal of collecting and analyzing client communications is to determine if a problem or issue has arisen within a client's production environment. To that end, the communications analysis unit 218 can search client communications for certain key words that are associated with a particular issue or problem. If one or more key words that relate to a specific type of problem or issue is found in the client communications, the communications analysis unit 218 is able to send that information to the evaluation unit 500 for deep correlation with other signals received by the system. It may send a notification about the potential issue or problem to a system administrator, or possibly to other elements of the production environment assistant so that a more detailed check could be performed, or so that remedial action can be taken.

The communications analysis unit 218 could compare key words in client communications to information technology words that have known applicability in certain contexts. The goal of the analysis is to determine a client's intent and acts with respect to specific types of issues or problems. A dictionary of information technology or computer words could be consulted for this purpose. Moreover, the communications analysis unit 218 may build up such a dictionary or database of key words over time, where certain key words become associated with certain types of problems. Such a dictionary or database could be specific to a particular client, or it could have broader applicability to multiple clients. This type of historical knowledge can be highly valuable in identifying when a problem has reoccurred.

The communications analysis unit 218 may use Natural Language Processing (NLP) algorithms to first build a corpus of IT systems intents and IT systems assets. For example, an intent is an action that can be taken automatically or manually on a system. "Restart", "Increase", "Reboot", "Shutdown", "Delete", "Add", "Scale", "Tune" are all examples for intents or actions that can be taken on an IT system. "CPU", "Memory", "Subnet", "Network Interface", "Garbage Collection", "I/O", "Disk" are all IT terms. Numbers and percentages, as well as nouns, are the bounding pieces creating the overall sentence semantics. For example, when a human is reporting via a computer messaging system: "Due to High CPU usage, I needed to restart server name: abc123" the communications analysis unit 218 analyzing the sentence would identify the key words such as "Due", "High", "CPU", "Restart", "abc123". Identifying those key words and sending them to the evaluation unit 500, helps building causality and remediation connections between generic IT components which can be adapted for a specific environment or which can be used transitively in a broader IT systems environments.

As mentioned above, the types of data that can be collected by the data collection unit 200 can include various data points about individual computer systems or networks which exist within a client's production environment. The data points can also relate to the operations of individual software applications which are running within a client's production environment. Moreover, the data acquired by the data collection unit 200 can include information about how the business is running, such as financial information, sales data, traffic within an online retailing system, traffic within a communication system, as well as virtually any other type of data relating to the operations of a client's production environment.

Many clients will have already installed various monitoring systems or monitoring software applications to monitor the operations of the client's production environment. The data collection unit 200 can obtain information reported by those separate monitoring systems, often through APIs provided with those monitoring systems or monitoring software applications. Examples of such monitoring systems or monitoring software applications include Graphite, New Relic, Appdynamics, Datadog, Ruxit (by Dynatrace), Takipi, Rollbar, Sensu, Nagios, Zabbix, ELK Stack, as well as virtually any other production environment monitoring tool.

The data transformation and storage unit 300 of the production environment assistant 100 includes a data queue 302. Data and information obtained by the data collection unit 200 is first loaded into the data queue 302. The data queue 302 could include a data points queue 304 and an events queue 306. The data queue 302 is configured to hold a substantial amount of data which has been received from various clients' production environments. For example, the data queue 302 could be configured to hold up to one week's worth of data reported from a plurality of different client production environments. By placing the data immediately into the data queue 302, one can ensure that received data is never lost.

A storage optimization unit 314 then analyzes the data in the data queue 302 and stores all or various portions of the received data into a short-term repository 308, a medium-term repository 310, and a long-term repository 312. The storage optimization unit 314 can act to store the data in a highly efficient manner to minimize data storage costs. In addition, the storage optimization unit 314 may be responsible for breaking received data into component parts, and storing the received data in pre-defined formats which make it easier to analyze that data a later point in time.

The storage optimization unit 314, implements a configuration template that supports extending the different storage types and periods. For example, the template may include categories which first utilize extremely short time repository by memory only storage. This might be implemented as a tmpfs file system on each node, or by any other in-memory type technology such as caching layer (Redis, Memcache, RabbitMQ, ActiveMQ or any other related technology). The template might also include the short term, medium term and long term storage layers accordingly. The configuration template also might include each storage layer priority, fallback policy determination (in case of a write or read failure) and object type to be stored.

By checking first with the configuration template, the storage optimization unit 314 computes in real-time for each storage object, what is the optimal storage layer to use, and then implements a tiered-storage mechanism based on the policy. Once an object needs to be retrieved, since the object type and time is already known, it's possible to skip the search action and point directly to the relevant tier. This provides a great advantage with storage cost as well as performance.

The storage optimization algorithm can also split the actual data between different tiers and split it into separate files. For example, if a data stream contains 1 month of data points, the optimization storage unit 314 reads the policy template and based on time, priorities, cost or any other attribute, that the 1-month of data points can be split into smaller sections, and also be split across the different storage types. On read request, each specific piece is retrieved and aggregated in memory before being sent back as the full result.

A metrics unit 400, which is part of the production environment assistant 100, is responsible for calculating various metrics based upon the data which has been received or obtained from a client's production environment. The metrics unit 400 includes a metrics configuration unit 404 which allows a system administrator and/or a client to determine what type of metrics are to be calculated from the client data. A metrics calculation unit 406 then actually performs the metric calculations based on the configurations established by the metrics configuration unit 404.

Examples of metrics that can be calculated from data points received from a client's production environment include an average value, a mean, a variance, a covariance, as well as virtually any other type of metric. Such metrics can be calculated using multiple outlier detection algorithms, such as DBSCAN, Hampel Filter, HoltWinters. These metric values could be calculated for a certain period of time, or based on some other type of grouping. The metrics calculation unit 406 can utilize data pulled directly from the data queue 302 of the data collection and transformation unit 300, or data pulled from the short-term repository 308, medium-term repository 310 and long-term repository 312, or data from combinations of those sources. Calculated metrics are stored in a metrics repository 407.

The metrics unit 400 includes a metrics query interface 408 which allows system administrators, users, and other elements of the production environment assistant 100 to perform queries and obtain information from the calculated metrics information in the metrics repository 407. The metrics query interface 408 makes it possible to obtain calculated metrics for a single client's production environment, or metrics which have been calculated for multiple different clients' production environments. As a result, one can compare the metrics from one production environment to the metrics in a different production environment to help identify trends, issues and problems.

The metrics calculation unit 406 may also calculate metrics of metrics. In other words, an average value of a production environment variable which has been calculated for multiple different similar production environments could be calculated by the metrics calculation unit 406 to create a global average for that variable. This global average value would then be stored in the metrics repository 407. The global average value could then be used as a baseline against which a particular client's average value is judged. The particular client's average metric value for that variable would be compared to the calculated global average value for that variable to see how the particular client's production environment compares to the global average.

The ability to compare an individual production environment metric to a global average is something that many individual companies are unable to perform. Typically, a company will only have access to their own metrics. Thus, the ability to compare metrics from one client's production environment to average values for the same metrics can be a powerful tool in helping to identify issues and problems within individual production environments. In addition, because the metric unit 400 can store not only raw data points, but also events, an aggregation of multiple attributes and combinations of events and data points are possible. This powerful combination, allows the administrator to query for calculated data points and examine correlated events at the same time. That mechanism could also be used automatically to identify potential correlations between events, system/server and time.

Event correlations are the methods and means for detecting the occurrence of exceptional events in a complex system and for identifying which particular event occurred and where it occurred. The set of events which occur can be detected in the system over a period of time as event streams.

The evaluation unit 500 of the production environment assistant 100 utilizes received client data as well as calculated metrics to perform various analyses that are designed to determine if issues or problems are occurring within a client's production environment, as well as how two or more problems or issues are related to each other. Often, events are related based on the timeline and dependencies, as event correlation can take place in both the "space" and time dimensions.

The evaluation unit 500 includes an evaluation rules unit 502 which is used to set up individual rules which are custom tailored to each individual client. The evaluation rules unit 502 includes a rules set up unit 504 that allows system administrators and clients to set up various rules which determine what types of evaluations are to be performed for a client's production environment. The rules could also establish how frequently and/or under what circumstances a particular type of evaluation should be performed. The rules could also establish various other aspects of how a particular analysis is to be performed.

The evaluation rules unit 502 also includes a customer interface 506 which makes it possible for an individual customer to access the evaluation rules unit to monitor the types of evaluations which are occurring, and to also alter the evaluation rules which have been set up for the client. The evaluation rules unit 502 also includes a rules database 508 where the evaluation rules are actually stored.

An analysis unit 512 of the evaluation unit 500 conducts various analyses using the rules stored in the rules database 508. The analysis unit 512 can perform traditional analyses, as well as artificial intelligence-based analyses. For example, the analysis unit 512 could utilize a DROOLS based engine for analyzing data based on a rule base which contains expert knowledge in the form of "if-then" or "condition-action" rules. The condition part of each rule determines whether the rule can be applied based on the current state of the working memory. The action part of a rule contains a conclusion which can be drawn from the rule when the condition is satisfied. The working memory is constantly scanned for facts which can be used to satisfy the condition part of each rule. When a condition is found, the rule is executed. Executing a rule means that the working memory is updated based on the conclusion contained in the rule.

Alternatively, the analysis unit 512 could utilize various types of rules based artificial intelligence engines such as the CLIPS system, which is an open source system developed by NASA, or the open source DROOLS based engine. Various other types of artificial intelligence techniques and evaluation engines could also be used by the analysis unit 512 to analyze client data and metrics, and to apply correlation and noise reduction in order to determine if a problem or issue is occurring within a client's production environment. The analysis unit 512 could also determine the root-cause of an issue based on reasoning.

The AI approach used by the analysis unit 512 utilizes knowledge obtained through the various events from the different IT monitoring solutions/sensors/agents, as well as from the end-user feedback. Reasoning is accomplished by applying rules to detect the semantics of the event, as well as generic models which rely on generic algorithms, rather than expert knowledge, to correlate events based on an abstraction of the system architecture and its components.

As an example, if events A and B are detected, and it is known that event A could have been caused by problems n1, n2, or n3, and event B could have been caused by problems n2, n4, or n6, then the diagnosis is that problem n2 has occurred, because it represents the intersection of the possible sources of events A and B. Planning is accomplished by analyzing the entire system state and conditions before applying an action or recommendation. Learning is accomplished by applying multiple machine learning algorithms in the family of supervised and unsupervised learning.

Another learning approach which could be taken is the Version Space algorithm. Given a hypothesis space H, and training data D, the version space is the complete subset of H that is consistent with D. The version space can be naively generated for any finite H by enumerating all hypotheses and eliminating the inconsistent ones. In another learning case, one would first scan a database to find frequent items. e.g. {a, b, c, d . . . }. For each pair of such items, try to create a rule with only two items. e.g. $\{a\} \Rightarrow \{b\}$. Then, find larger rules by recursively scanning the database for adding a single item at a time to the left or right part of each rule (left and right expansions). e.g. $\{a,c\} \Rightarrow \{b\}$, then $\{a,c,d\} \Rightarrow \{b\}$, etc.

Each rule created is tested to see if it is valid. This provides an automated and constant learning approach to rules generation and adaptation. It also provides the ability to transfer rules and reasoning between different customers. Since IT production environments can be identified with exact or similar technologies, there are specific technology signatures that might be used. For example, customer A could set rules related to its environment that is deployed inside container technology such as Docker. Since the container technology itself is well recognized, it has a set of sensors and parameters that are always relevant in any deployment. Once the base signature is detected with Customer B, the system might inject the same generic rules and recommend the user to make the relevant adaptation to his own needs.

Last, natural language processing (communication), perception and the ability to act is also implemented as part of the remediation engine. Some of the Preventive monitoring approaches include statistical analysis (mostly Bayesian networks), neural networks and fuzzy logic.

The evaluation unit 500 can also include a data acquisition unit 510, which is used by the analysis unit 512 to obtain the data needed to perform a particular type of analysis. The data acquisition unit 510 can obtain data from the metrics repository 407, and also from any of the data sources provided by the data collection and transformation unit 300. In some instances, the data acquisition unit 510 may engage the services of the active collection unit 208 to obtain certain data needed to perform an analysis.

If the analysis unit 512 ultimately concludes that a problem or issue is occurring or may be occurring within a client's production environment, the analysis unit indicates that an "incident" has occurred. The term "incident" is a broad term which is intended to apply to any type of activity, trend, occurrence or event which could be viewed as an issue or problem for a client's production environment. Incidents can be raised once a specific condition has been confirmed by the evaluation unit 500. A condition can be an Anomaly detected, a specific metric calculation or data point that is above or below a threshold, an event (such as a new code deployment, a new scaling activity detected or a configuration change detected), a complicated computation such as rate of change, or even a combination between all of the above. Incidents can be analyzed as well and taken into account for the next evaluation cycle.

When incidents are determined to have occurred, the incidents are reported to the incident unit 600. The incident unit 600 includes an incident database 602 where such incidents are recorded. The incident unit 600 also includes an incident query unit 604 which can be used to query information in the incident database 602. Queries could be performed for a single client's production environment. Alternatively, the incident query unit 604 could allow a user to perform a query for the same or similar incidents that have occurred across multiple different client production environments.

For example, if a new specific type of incident has occurred for the first time for a first customer's production environment, one could then query the incident database 602 to determine if the same or a similar incident has occurred in other client production environments. If so, one could then look to those other client production environments to determine what sort of remedial action cured or mitigated the incident. Thus, the ability to query for incidents across all client production environments provides a valuable tool which can help to quickly determine how to solve or mitigate issues.

This ability to monitor and learn from multiple client production environments dramatically increases the knowledge base compared to a system that is dedicated to only one production environment. Also, the ability to review data generated from multiple client production environments helps with reasoning and causation inference. The ability to index in a shared fast data store that includes a knowledge base of incidents across clients, environments, events and data points allows for similarities algorithms based on time, semantics, key-terms and dependencies between systems.

For example, if the same event name occurred after a specific sequence, the system assigns that sequence, and for each step a number, as a representation. Applying sequence matching, similarities algorithms such as Hamming Distance, BM25, DFR, DFI, IB similarities, LM Dirichlet, LM Jelinek Mercer similarity as well as a priory algorithms can determine best potential match and score each relevancy. Here again, if a client only had his own past incidents to rely upon, this ability would not exist.

The notification unit 700 is responsible for notifying a client, a system administrator or a technician when a problem or issue has occurred in a client's production environment. As noted above, the analysis unit 512 of the evaluation unit 500 is responsible for determining when an incident has occurred within a client's production environment. In addition to reporting such an incident to the incident unit 600, the analysis unit 512 may report the occurrence of an incident to an escalation policy trigger unit 708 of the notification unit 700. Alternatively, an element of the incident unit 600 may report the occurrence of an incident within a client's production environment to the escalation policy trigger unit 708.

An escalation policy is a mechanism for alerting an individual as to the occurrence of a problem or issue within a client's production environment. A typical escalation policy would state that if incident A has occurred, notify individual X. An escalation policy could also require that multiple conditions occur before someone is notified of a potential problem. For example, an escalation policy could state that if incident A and incident B both occur within a sixty-minute time period, then notify individual Y. Further, an escalation policy could indicate that multiple individuals are to be notified upon the occurrence of certain conditions. An escalation policy could also include information about how to notify individual X. The notified individual would then be responsible for attempting to resolve or mitigate the problem or issue.

An escalation policy setup unit 702 allows system administrators and clients to setup or modify individual escalation policies. Those escalation policies are then stored in an escalation policy database 704. An escalation policy activation unit 706 is responsible for determining when a reported incident should trigger one or more escalation policies, for coordinating the activation of the escalation policies, for notifying individuals under escalation policies, and for keeping those individuals identified in the escalation policies apprised as to the status of problem resolution.

As noted above, an escalation policy indicates that if event A has occurred, individual X should be notified. If the conditions set forth in an escalation policy have been satisfied, such as the occurrence of incident A, then the escalation policy is "triggered." Once triggered, an escalation policy can be "activated," meaning the individual or individuals identified in the escalation policy are notified of a problem or issue requiring attention. Alternatively, a triggered escalation policy can be placed "on-hold," in which case the individual(s) identified in the escalation policy is/are not immediately notified. Typically, an escalation policy would be placed on hold because another, different escalation policy that deals with the same problem has been activated, and the escalation policy activation unit 706 is waiting to see whether the individual notified under the activated escalation policy will be successful in resolving or mitigating the problem or issue.

The escalation policy trigger unit 708 receives reports of incidents, from either the incident unit 600 or the analysis unit 512 of the evaluation unit 500. The escalation policy trigger unit 708 then compares the reported incidents to the conditions of escalation policies stored in the escalation policy database 704 to determine whether one or more escalation policies should be triggered by the reported incident(s). In some instances, a single reported incident may result in the triggering of multiple escalation policies. In other instances, an escalation policy may require that multiple incidents occur before the escalation policy is triggered. However, even when multiple incidents must occur to trigger an escalation policy, the occurrence of multiple incidents may still trigger multiple escalation policies.

Often, multiple reported incidents may all be tied to the same basic problem or issue in a client's production environment. For example, the incident unit 600 may report the occurrence of incidents A, B, C and D to the escalation policy trigger unit 708, and the occurrence of all four incidents may be tied to the same underlying problem or issue in a client's production environment. The occurrence of incidents A, B and C may trigger escalation policy X. The occurrence of incidents B, C and D may trigger escalation policy Y. Further, the occurrence of incidents A, C and D may trigger escalation policy Z. In such a situation, the same underlying problem or issue in the client's production environment will have triggered three different escalation policies, each of which requires the notification of a different individual.

As noted in the background section above, we are seeking to avoid a situation where all three of the individuals identified in the three escalation policies are all trying to resolve or mitigate the same basic problem or issue at the same time. In addition to being inefficient, the efforts of a first one of the three individuals may interfere with the efforts of one of the other individuals, thereby making it even more difficult to resolve or mitigate the underlying problem or issue.

An escalation policy coordinator 714 of the escalation policy activation unit 706 is configured to prevent multiple individuals from being simultaneously notified under multiple different escalation policies that have been triggered by the same basic problem or issue. The escalation policy coordinator 714 may also act to coordinate the efforts of multiple individuals to resolve a problem or issue. Further, the escalation policy coordinator may act to keep all individuals identified in the escalation policies notified as to the efforts that have been made to try to resolve or mitigate a problem or issue, to thereby help prevent duplication of effort.

As will be explained in greater detail below, when one or more incidents are reported to the escalation policy trigger unit 708, the escalation policy trigger unit 708 determines which escalation policies should be triggered by the reported incident(s). If multiple escalation policies are triggered, the escalation policy trigger unit 708 also determines if two or more triggered escalation policies appear to have been triggered by the same basic underlying problem or issue.

The determination that two or more escalation policies were likely triggered by the same basic underlying problem or issue may use information stored in an escalation policy information database 712. Information stored in the escalation policy information database 712 may be input by system administrators or by clients to indicate which escalation policies are likely tied to the same basic problem or issue. In addition, machine learning can be used to determine when two or more escalation policies are likely to have been triggered by the occurrence of the same basic underlying problem or issue, and the results of that machine learning can be stored in the escalation policy information database 712.

If the escalation policy trigger unit 708 determines that multiple escalation policies have been triggered by the same basic problem or issue in a client's production environment, an escalation policy coordinator 714 then handles the selective activation of the escalation policies. The escalation policy coordinator 714 first consults with an effectiveness determination unit 710, which determines which of the triggered escalation policies is most likely to resolve or mitigate the problem or issue. The effectiveness determination unit 710 can use information stored in the escalation policy information database 712, as well as other sources of information, to identify the triggered escalation policy that is most likely to result in resolution or mitigation of the problem or issue.

A system administrator can configure the system so that when any two given escalation policies are triggered by a certain type of event, the system will know which of the two escalation policies is most likely to resolve the problem or issue that triggered the escalation policies. That information would be stored in the escalation policy information database 712.

Alternatively, the notification unit 700 could be trained over time via a machine learning process so that it knows which of any two escalation policies is most likely to resolve or mitigate a problem or issue. For example, during a training period whenever the same two escalation policies are triggered, the system could activate only the first escalation policy half of the time and activate only the second escalation policy the other half of the time. The system could then note which escalation policy more often resulted in the issue being resolved. Or perhaps also which of the two escalation policies resulted in the most rapid resolution of the problem. The escalation policy that seems to be better at solving the problem or that appears to more quickly resolve the problem would then be deemed most likely to resolve the problem or issue, and that information would be stored in the escalation policy information database 712.

The escalation policy coordinator 714 then activates the triggered escalation policy that is most likely to result in resolution or mitigation of the problem or issue and places all the other triggered activation policies on hold. The escalation policy coordinator 714 uses the notification transmittal unit 718 to notify the individual(s) identified in the activated escalation policy as to the existence of the problem or issue.

A user interface 716 provides an interface that individuals identified in escalation policies can use to help coordinate the resolution of problems. When the escalation policy coordinator 714 activates the escalation policy most likely to result in resolution of the problem, and places all the other escalation policies on hold, the status of each of the escalation polices will be noted in the user interface 716. The individual notified under the activated escalation policy will see that his escalation policy was activated, and that there are several other escalation policies that were also triggered, but which have been placed on hold. If one of the individuals that is to be notified under one of the escalation policies that were placed on hold were to check the user interface 716, that individual would see that an escalation policy where he is the individual to be notified has been triggered, but placed on hold, indicating the individual need not take any action at the present time.

An individual that has been notified under an activated escalation policy can respond in multiple different ways. First, the individual could attempt to solve the problem or issue. If the individual is successful in resolving or mitigating the problem or issue, the individual reports success back to the escalation policy coordinator 714. A report of success could be delivered to the escalation policy coordinator 714 via the user interface 716, or via some other messaging channel. The escalation policy coordinator 714 would then cancel all of the triggered escalation policies.

If the individual attempts to solve the problem, but is unsuccessful, the individual reports lack of success back to the escalation policy coordinator 714. At that point, the escalation policy coordinator 714 puts the first activated escalation policy on hold, and then checks with the effectiveness determination unit 710 to identify one of the untried escalation policies that has the next-best chance of resolving or mitigating the problem or issue. The escalation policy coordinator 714 then activates that escalation policy, which involves notifying the individual identified in the escalation policy of the problem using the services of the notification transmittal unit 718. This process can repeat several times if each notified individual is unsuccessful at resolving the problem until all escalation policies have been attempted.

If a first individual that has been notified under an escalation policy does not believe they will be helpful in resolving the problem, the first individual can signal this fact to the escalation policy coordinator 714 via the user interface or via an alternate messaging channel. If that occurs, the process described above is performed to place the first individual's escalation policy on hold, and to activate the escalation policy that is next-most likely to resolve the problem. Also, the first individual may signal the escalation policy coordinator 714 that they cannot resolve the problem, but that a second individual identified in one of the escalation policies that have been placed on hold is probably the best person to address the problem. Under these circumstances, the escalation policy coordinator 714 will place the first individual's escalation policy on hold, and then activate the escalation policy for the second individual identified by the first individual.

In still other instances, a first individual identified in an activated escalation policy may signal that he needs help addressing the problem. Under those circumstances, the escalation policy coordinator will keep the first escalation policy active, and also activate a second escalation policy so that a second individual is notified of the problem. The second escalation policy that is activated could be the one that is next-most likely to resolve the problem. Alternatively, the first individual could identify a second individual who the first individual would like to be notified, and the escalation policy coordinator 714 would then activate the escalation policy for that second individual.

The notification unit 700 includes a notification transmittal unit 718 which is responsible for reporting incidents and other information to a client, a system administrator or a technician, as specified by an escalation policy. The notification transmittal unit 718 can utilize various different communication channels to send such notifications. For example, the notifications could be sent via email, text messaging, instant messaging, via telephone calls, via pagers, or via virtually any other communication channel which can connect to an individual. Typically, an escalation policy will itself specify how to notify the individual identified in the escalation policy. This could include only a single communication channel, or multiple communication channels that are to be attempted in a specified order.

The escalation policy activation unit 706 further includes an assistance recommendation unit 717 that is configured to identify individuals that may be of assistance in helping to resolve or mitigate a problem or issue with a computer-based production environment. When an escalation policy is triggered due to the occurrence of a problem or issue in a computer-based production environment, the assistance recommendation unit 717 can consult one or more user proficiency databases 758 (see FIG. 8 and the description below) to identify one or more individuals that have knowledge relating to the problem or issue that triggered the escalation policy. When the notification transmittal unit 718 reports an incident to a client, a system administrator or a technician in accordance with a triggered escalation policy, the notification transmittal unit 718 can also provide the identity and/or contact information for one of more individuals who have knowledge relating to the problem or issue and who have been identified by the assistance recommendation unit 717. The client, system administrator or technician notified in accordance with the triggered escalation policy could then seek assistance from the identified individual(s) in helping to resolving the problem or issue.

As will be explained in more detail below, the assistance recommendation unit 717 could select a single individual that appears to have the most knowledge relating to the problem or issue that triggered the escalation policy, based on proficiency ratings in the user proficiency databases 758. Alternatively, the assistance recommendation unit 717 could select several individuals that appear to have proficiency with respect to the problem or issue that triggered the escalation policy, and the notification transmittal unit 718 could send the identities and contact information for all of those individuals to the client, system administrator or technician that is notified in accordance with the escalation policy. Also, the assistance recommendation unit 717 may order a list of several individuals having knowledge relating to the problem or issue that triggered the escalation policy based on the relative proficiency of each of the individuals so that the client, system administrator or technician notified under the escalation policy will know which individual to contact first for assistance in resolving the problem or issue.

More details about how the elements of the notification unit 700 operates to resolve or mitigate an identified problem or issue are provided below.

Figure 8:
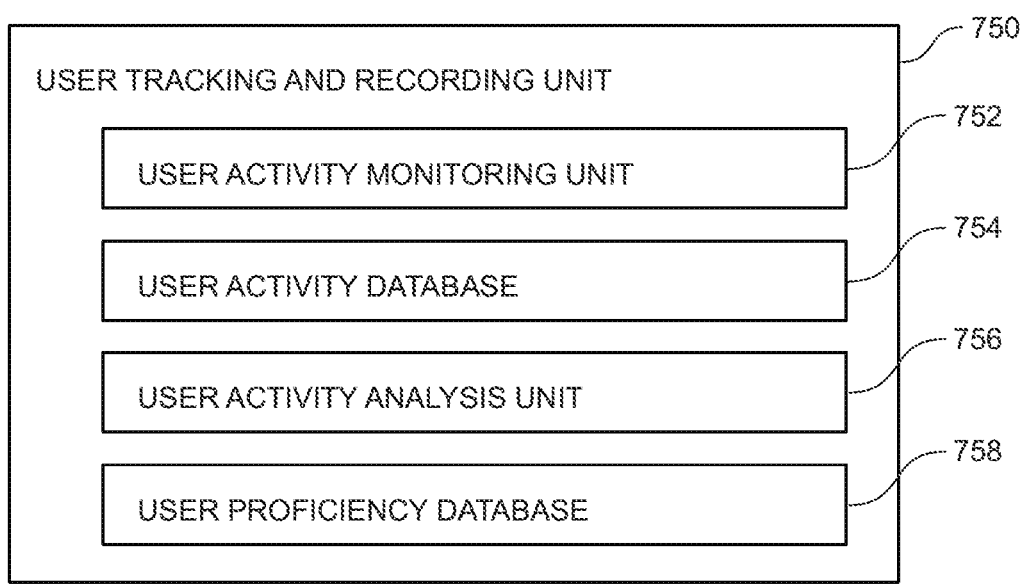
FIG. 8 is a block diagram illustrating various elements of a user tracking and recording unit.

FIG. 8 illustrates elements of a user tracking and recording unit 750 that is configured to track user interactions with a production environment assistant 100. The user tracking and recording unit also is configured to generate and maintain user proficiency ratings that are indicative of users' proficiency with respect to individual issues or problems that can arise in a computer-based production environment, and/or the user's proficiency with respect to various features of the production environment assistant 100.

The user tracking and recording unit 750 includes a user activity monitoring unit 752 that monitors user activity in the production environment assistant 100. Typically, this takes the form of monitoring when and how users interact with a user interface 720 of the production environment assistant 100. This can include noting which features and user interface 720 components of the production environment assistant 100 a user spends time on, how much time is spent on each feature, and what functions the user performs. Of course, the user activity monitoring unit 752 maps those user activities back to an entity name or identifier associated with a monitored computer-based production environment. The user activity monitoring unit 752 then causes information about a user's interactions with the production environment assistant 100 to be stored in a user activity database 754.

In addition, when an escalation policy is triggered elements of the notification unit 700 may monitor the time spent from triggering of an escalation policy to resolution or mitigation of the problem or issue that caused the escalation policy to be triggered. Also, elements of the notification unit 700 and the user activity monitoring unit 752 may track the actions of the individual notified under the terms of the escalation policy, as well as the actions of any individual recommend to the notified individual as being knowledgeable about the problem or issue as those individuals go about attempting to solve or mitigate the problem or issue. Information gathered in this fashion may be used by the user activity analysis unit 756 to generate user proficiency scores.

Moreover, elements of the data collection unit 200 that is responsible for collecting information about activity, events, performance, problems and issues within a computer-based production environment may collect information about events that occur within a computer-based production environment as individuals go about attempting to cure or mitigate a problem or issue that triggered an escalation policy. This may include tracking and correlating events with the times at which an incident was noted, that the incident was acknowledged and the time at which the incident was marked as closed or resolved. Essentially, this involves correlating corrective actions taken by those individuals to the outcome of their corrective actions. This information may also be used by the user activity analysis unit 756 to generate proficiency scores for users.

The user tracking and recording unit also includes a user activity analysis unit 756 that is configured to generate one or more proficiency ratings for each user based on information stored in the user activity database 754. Each proficiency rating for a user is indicative of the user's proficiency with respect to a particular issue or problem that can arise in a computer-based production environment, or the user's proficiency with respect to a particular feature of the production environment assistant 100. A user's proficiency rating with respect to an issue or feature can be based on how often the user deals with the issue or utilizes the feature, how much time the user spends on the issue or feature, the complexity of the user's interactions with the issue or feature, as well as various other factors. The user activity analysis unit 756 may also use other sources of information, in addition to the information stored in the user activity database 754, to generate proficiency ratings for users.

The user activity analysis unit 756 then causes generated user proficiency ratings to be stored in one or more user proficiency databases 758. The user proficiency databases 758 can include a static database of user proficiency scores that is populated with user proficiency scores by a system administrator or other individuals with knowledge of the skills of various users. The user proficiency databases 758 may also include one or more databases that are constantly or periodically updated based on user activity, as explained below.

In the case of user proficiency databases 758 that are constantly or periodically updated, and as will be explained in more detail below, after the user activity analysis unit 756 generates an initial set of proficiency ratings for a user and stores the initial set of proficiency ratings in the user proficiency databases 758, the user's proficiency ratings can be updated over time. The user activity monitoring unit 752 continuously monitors each user's interactions with the production environment assistant 100 and continuously stores new information in the user activity database 754. The user activity analysis unit 756 utilizes any newly stored user activity information in the user activity database 754 to generate updated user proficiency scores. The user activity analysis unit 756 then stores the updated proficiency scores in the user proficiency database.

The generation of updated user proficiency scores can be conducted on a periodic basis, or each time that new information for a user is recorded in the user activity database 754. In this way, as a user gains experience with the production environment assistant 100 and becomes more knowledgeable about individual issues that can arise in a computer-based production environment, as well as the features of the production environment assistant 100, the user's proficiency ratings in the user proficiency databases 758 are updated to reflect the user's greater knowledge and skill.

Figure 9:
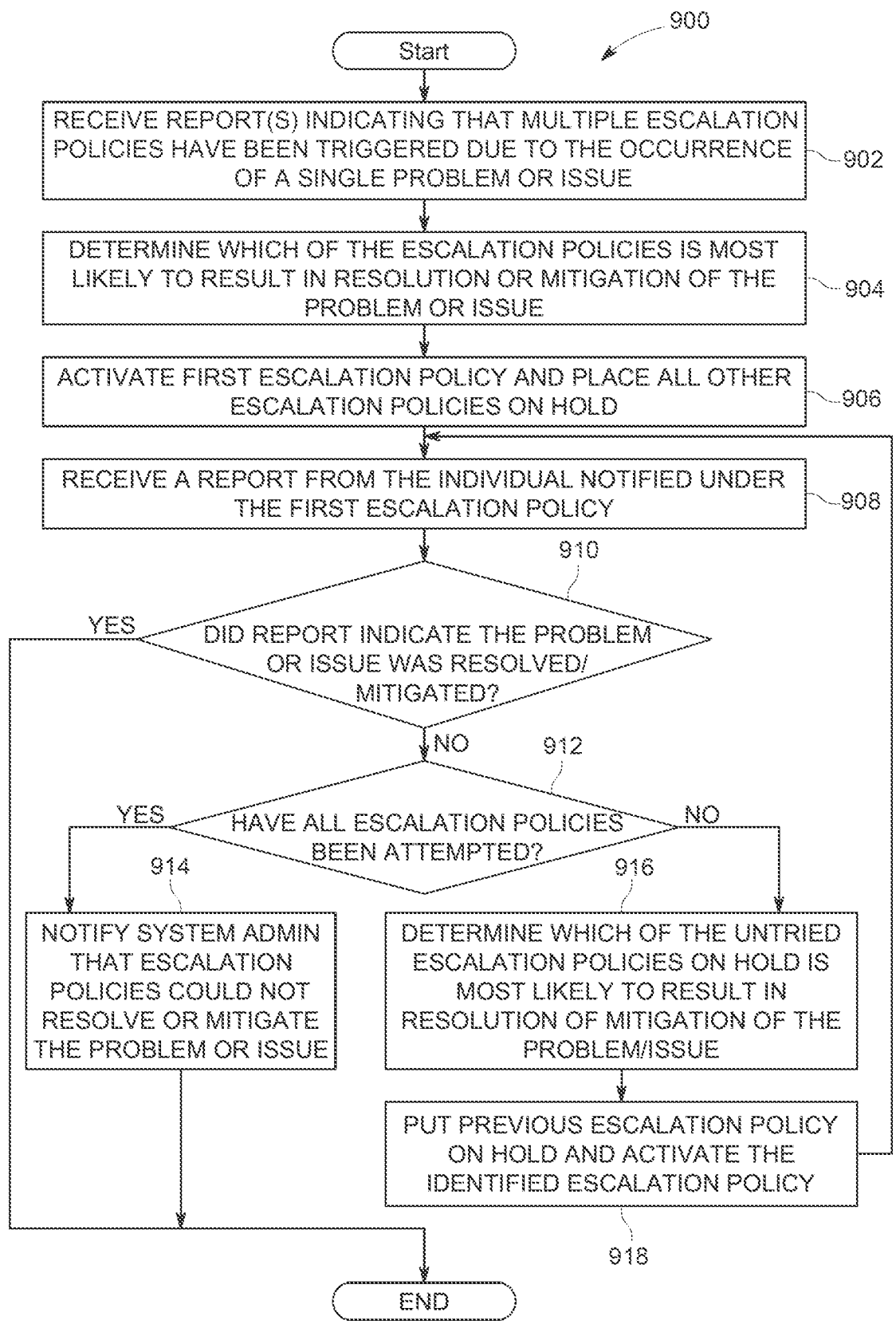
FIG. 9 illustrates steps of a first method for coordinating the activation of multiple escalation policies.

FIG. 9 illustrates steps of a first method for coordinating the activation of multiple triggered escalation policies. The method 900 begins and proceeds to step 902 where an escalation policy trigger unit 708 of an escalation policy activation unit 706 receives one or more reports about incidents that have occurred within a client's production environment. The escalation policy trigger unit 708 determines which escalation policies should be triggered by the reported events using information in the escalation policy database 706. The escalation policy trigger unit 708 also determines if multiple triggered escalation policies appear to have been triggered by the same underlying problem or issue using information in the escalation policy information database 712. For purposes of this discussion, we will assume that the escalation policy trigger unit 708 determines that multiple triggered escalation policies appear to have been triggered by the occurrence of a single problem or issue in the client's production environment.

In step 904, the effectiveness determination unit 710 identifies a first of the triggered escalation policies that is most likely to resolve or mitigate the problem or issue. In step 906, the escalation policy coordinator 714 activates the first escalation policy and places all the remaining escalation policies on hold. Activation of the first escalation policy would include notifying the individual(s) identified in the first escalation policy of the problem or issue using the services of the notification transmittal unit 718. This can also include updating the user interface 716 to indicate which of the escalation policies was activated and which of the escalation policies were placed on hold.

Once the individual identified in the first escalation policy has been notified, the notification unit 700 waits to hear back from the individual. In many cases, that individual will then try to resolve or mitigate the problem. Ultimately, the individual will send a report to the notification unit 700 that indicates either: (1) that the problem has been resolved or mitigated; or (2) that the individual was unable to resolve or mitigate the problem; or (3) that the individual is not the correct person to address the problem; or (4) that the individual needs assistance to address the problem. That report from the individual is received in step 908. The individual's report could be received via the user interface 716 or via communication channel, such as return message that is sent from the individual to the notification unit 700 via the same communication channel that was used to notify the individual of the problem.

In step 910, a check is performed to determine if the individual's report indicates that the individual was successful in resolving or mitigating the problem or issue. If so, all of the triggered escalation policies are cancelled and the method ends.

If the check performed in step 910 indicates that the individual was not able to resolve or mitigate the problem or issue, the method proceeds to step 912 where a check is performed to determine if all of the triggered escalation policies have been tried in an attempt to resolve the problem or issue. If all escalation policies have been tried and the problem or issue remains unresolved, the method proceeds to step 914 where a system administrator is informed that activation of all of the triggered escalation policies was unable to resolve or mitigate the problem or issue, and the method then ends.

If the check performed in step 912 indicates that not all of the triggered escalation policies have been activated, the method proceeds to step 916 where the effectiveness determination unit 710 determines which of the escalation policies that have not yet been tried is most likely to resolve or mitigate the problem or issue. In step 918 the escalation policy coordinator 714 puts the previously tried escalation policy on hold and activates the escalation policy identified in step 916. This could include sending a notification to the individual identified in the escalation policy using the services of the notification transmittal unit 718.

Note, a report received from an individual who was unable to resolve or mitigate the problem or issue could include information about what that individual did in an attempt to resolve or mitigate the problem or issue. That information could be made available to the other individuals identified in the triggered escalation policies via the user interface 716. When present, such information could help to avoid duplication of effort.

Also, a report from a first individual who was not successful in resolving or mitigating the problem or issue may also include an identification of an alternate escalation policy or a second individual that the first individual believes might be able to resolve or mitigate the problem or issue. When this occurs, step 916 would be unnecessary. Instead, the method would proceed straight to step 918 where the escalation policy identified by the first individual, or the escalation policy associated with a second individual identified by the first individual is activated.

After step 918, the method loops back to step 908 and the process described above is repeated until the check performed in step 910 indicates the problem or issue has been resolved or mitigated, or until the check performed in step 912 indicates all escalation policies have been tried. In either event, the method would then end.

Figure 10:
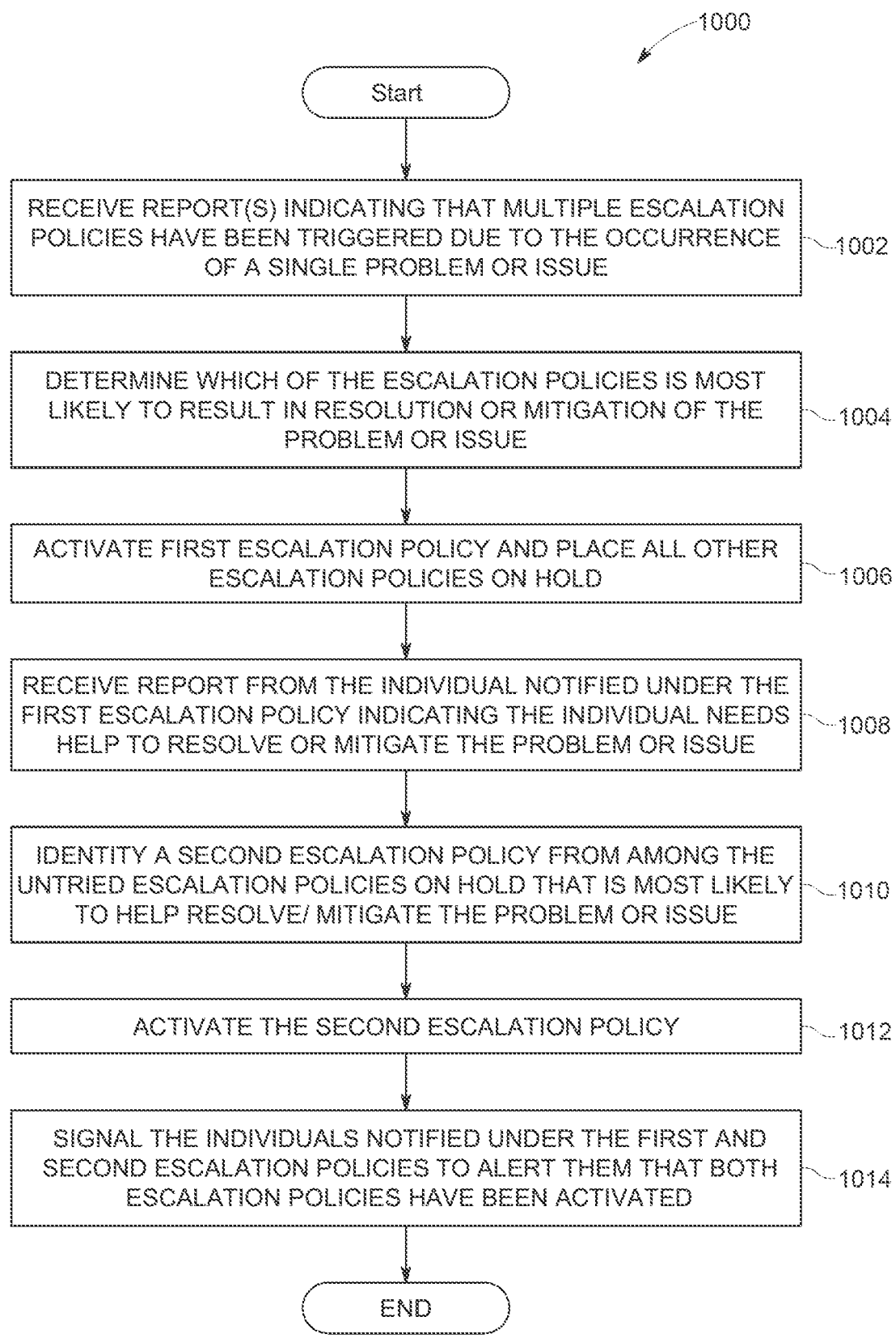
FIG. 10 illustrates steps of another method of coordinating the activation of multiple escalation policies.

FIG. 10 illustrates steps of an alternate method of coordinating the activation of multiple escalation policies that were triggered by the same underlying problem or issue. In this method, two or more escalation policies may be activated at the same time so that two or more corresponding individuals can work to resolve or mitigate the problem or issue.

The method 1000 begins and proceeds to step 1002 where an escalation policy trigger unit 708 of an escalation policy activation unit 706 receives one or more reports about incidents that have occurred within a client's production environment. The escalation policy trigger unit 708 determines which escalation policies should be triggered by the reported events using information in the escalation policy database 706. The escalation policy trigger unit 708 also determines if multiple triggered escalation policies appear to have been triggered by the same underlying problem or issue using information in the escalation policy information database 712. For purposes of this discussion, we will assume that the escalation policy trigger unit 708 determines that multiple triggered escalation policies appear to have been triggered by the occurrence of a single problem or issue in the client's production environment.

Next, in step 1004, the effectiveness determination unit 710 identifies a first of the triggered escalation policies that is most likely to resolve or mitigate the problem or issue. In step 906, the escalation policy coordinator 714 activates the first escalation policy and places all of the other triggered escalation policies on hold. Activation of the first escalation policy would include notifying the individual identified in the first escalation policy of the problem or issue using the services of the notification transmittal unit 718. This can also include updating the user interface 716 to indicate which of the escalation policies was activated and which of the escalation policies were placed on hold.

Once a first individual identified in the first escalation policy has been notified, the notification unit 700 waits to hear back from the first individual. In step 1008 of this method, when the first individual reports back the first individual indicates that he needs help to resolve or mitigate the problem or issue. In some embodiments, the method then proceeds to step 1010, where the effectiveness determination unit 710 identifies a second escalation policy from among the untried escalation policies that is next-most likely to resolve or mitigate the problem or issue. In step 1012 the escalation policy coordinator 714 activates this second escalation policy, which would include sending a notification of the problem to the individual identified in the second escalation policy.

In step 1014, the escalation policy coordinator 714 could update information made available to the individuals via the user interface 716 to indicate that both the first and the second escalation policies have been activated. Alternatively, step 1014 could involve the escalation policy coordinator 714 sending messages to the first and second individuals via the notification transmittal unit to indicate that both the first and second escalation policies are activated.

In some embodiments, the report received from the first individual in step 908 could include an identification of an alternate escalation policy or a second individual that the first individual believes might be able to help the first individual resolve or mitigate the problem or issue. When this occurs, step 1010 would be unnecessary. Instead, the method would proceed straight to step 1012 where the escalation policy identified by the first individual, or the escalation policy associated with a second individual identified by the first individual is activated.

Steps 1002-1014 of the method illustrated in FIG. 10 could be used to simultaneously activate two escalation policies when a first individual needs help in resolving or mitigating a problem or issue. Once a second escalation policy has been activated, elements of the notification unit 700 could operate in a manner similar to that described above in connection with FIG. 9 to try multiple escalation policies until the problem is resolved or mitigated, or until all escalation policies have been tried.

Note, first and second escalation policies may be triggered by two different types of events. It may be the case that when a first type of event triggers the first and second escalation policies, the first escalation policy is most likely to resolve the problem. Likewise, when a second type of event triggers the first and second escalation policies, the second escalation policy is more likely to solve the problem. Thus, the type of event that triggers the first and second escalation policies may be taken into account by the effectiveness determination unit 710 when it determines which of two escalation policies is most likely to resolve or mitigate a problem or issue in a client's production environment.

The user interface 716 could be used to convey many different types of information to the individuals who are notified under escalation policies. In addition to listing those escalation policies that have been triggered, and which of those escalation policies is active and which are on hold, the user interface can provide a running list of all attempts that various individuals have made to resolve a problem or issue. Thus, before a newly notified individual attempts to resolve a problem, the individual can review attempts made by others to resolve the same problem.

In some embodiments, an individual that has been notified under an escalation policies could use the user interface 716 to take the actions described above, which include indicating that a problem has been solved, indicating that the individual cannot solve a problem, and identifying a different escalation policy that a notified individual believes should be activated in addition to or instead of the current active escalation policy. Of course, such an interface could be used to communicate many other different things. Such a user interface could be provided via an Internet website, or as part of a software application running on a computer or a smartphone.

In some instances, users may be able to communicate with the notification unit 700 via natural language statements or questions that are provided via textual input, or via voice input. The system would be capable of speech recognition to convert spoken audio input to usable text, and the system also would be capable of correctly interpreting natural language inputs from the user. In the same fashion, the system could provide text or audio responses and prompts to the users.

In the methods described above, when a problem is noted, an effort is made to determine which of the triggered escalation policies is most likely to result in resolution or mitigation of the problem. As also explained above, a notification unit embodying the invention can be trained over time, using real world problem resolutions, to increase the accuracy of that determination. The end result is that the mean-time-to-resolution is decreased as compared to prior art systems. Also, the machine learning that can take place over time will tend to further decrease the mean-time-to-resolution as the system better learns which escalation policies will result in resolution of which problems. A notification unit embodying the invention will help to avoid wasting time passing a problem on to those individuals that cannot resolve the problem or waiting for a timeout timer to expire on individuals who are trying unsuccessfully to resolve a problem.

Figure 11:
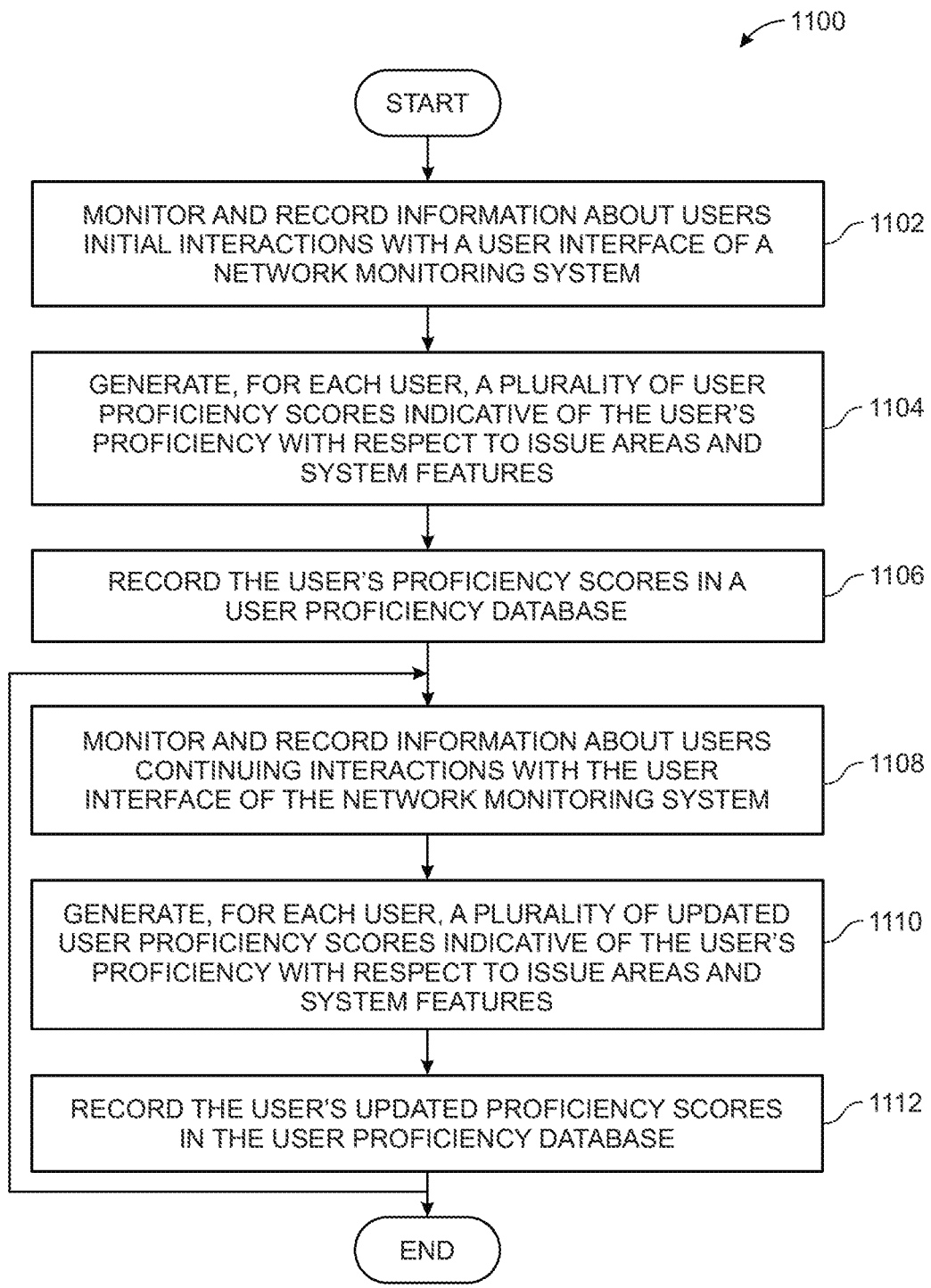
FIG. 11 illustrates steps of a method of generating and updating user proficiency scores.

FIG. 11 illustrates steps of a method that would be performed by elements of a user tracking and recording unit 750 to track user activity and to generate user proficiency ratings that are indicative of users' proficiency with respect to certain issues and with respect to certain features of a production environment assistant 100. The method 1100 begins and proceeds to step 1102 where a user activity monitoring unit 752 monitors user interactions with a production environment assistant 100. Typically, this takes the form of monitoring how a user interacts with a user interface 720 of the production environment assistant 100. In preferred embodiments, the user activity monitoring unit 752 monitors the activities of all users as they interact with all aspects of the user interface 720.

The monitoring performed in step 1102 can include monitoring which issues and performance metrics users review, which reports users request or review and which features of the user interface 720 the user spends time using. This can also include monitoring and detecting the amount of time that users spend reviewing certain performance metrics and issues that have arisen for a computer-based production environment and/or the amount of time users spend using individual features of the production environment assistant 100. This can also include monitoring or detecting the complexity of users' requests, interactions and usages of features of the production environment assistant 100, which can be indicative of the degree of proficiency of the users. The user activity monitoring unit 752 then records information about user interactions with the production environment assistant 100 in a user activity database 754.

In step 1104, the user activity analysis unit 756 generates an initial set of one or more proficiency ratings for each of a plurality of users of the production environment assistant 100. In preferred embodiments, the user activity analysis unit 756 generates a plurality of proficiency ratings for each user, where each proficiency rating is indicative of the user's proficiency with respect to a different issue that can arise in a computer-based production environment or with respect to a different feature of the production environment assistant 100. As noted above, the user activity analysis unit 756 uses the user activity information recorded in the user activity database 754 to generate the proficiency ratings for users. However, additional information from alternate sources can also be used in conjunction with user activity information in the user activity database 754 to generate the initial set of user proficiency ratings. In step 1106, the user activity analysis unit 756 then stores the generated initial set of user proficiency ratings in user proficiency databases 758.

The method then proceeds to step 1108, where the user activity monitoring unit 752 continues to monitor users' interactions with the production environment assistant 100, and where the activity monitoring unit 752 stores additional information about users' interactions with the production environment assistant 100 in the user activity database 754. In some embodiments, old data about users' interactions with the production environment assistant 100 may be deleted from the user activity database 754 after a certain amount of time has passed since the information was initially recorded, ensuring that only recent information about users' interactions with the production environment assistant 100 are present in the user activity database 754.

In step 1110, the user activity analysis unit 756 generates updated user proficiency ratings based, at least in part, on newly recorded information about users' interactions with the production environment assistant 100. Updated user proficiency ratings could be generated each time that new user activity information for users is recorded in the user activity database 754. Alternatively, the user activity analysis unit 756 could periodically generate updated user proficiency ratings based on the user activity information then existing in the user activity database 754. Here again, updated user proficiency ratings could also be based on additional information from alternate sources.

The user proficiency ratings generated by the user activity analysis unit can utilize machine learning techniques to generate user proficiency scores. This can include the user of recommender algorithms to output confidence scores associated with a user's proficiency score with respect to some or all of the issues or system features for which proficiency scores are generated.

In step 1112, the user activity analysis unit 756 stores the updated user proficiency ratings in the user proficiency database 758. The method then loops back to step 1108, and steps 1108-1112 are again performed. This process repeats until a system administrator halts the process, or until the production environment assistant 100 ceases operations. As a result, the user proficiency ratings for users of the production environment assistant 100 are constantly updated to reflect the users' current proficiency levels.

Figure 12:
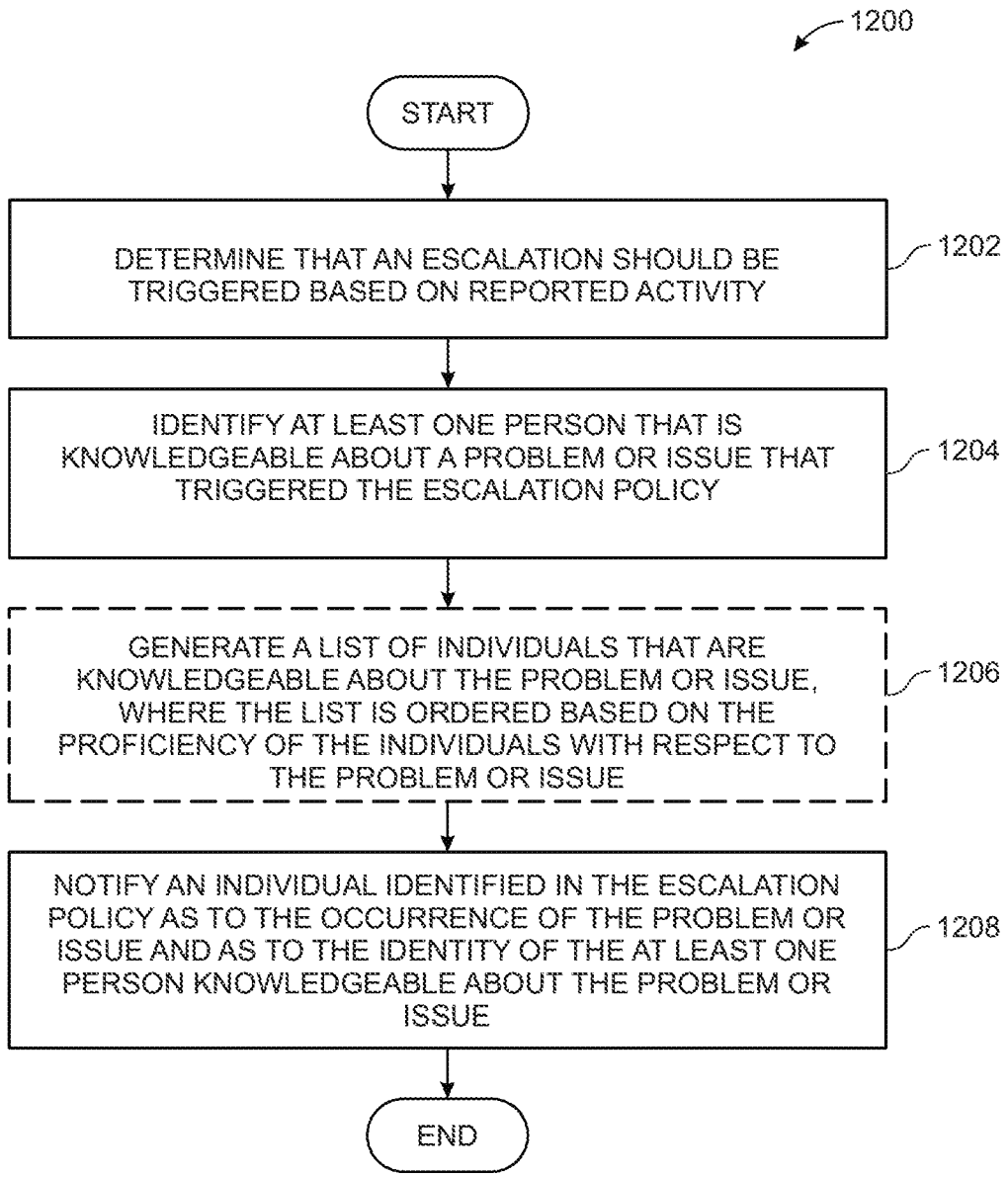
FIG. 12 illustrates steps of a method of alerting an individual as to the occurrence of a problem or issue in a computer-based production environment.

FIG. 12 illustrates steps of a method 1200 for notifying an individual identified in an escalation policy when an escalation policy is triggered by an issue or problem that has occurred in a computer-based production environment. The method begins and proceeds to step 1202 where an escalation policy trigger unit 708 of an escalation policy activation unit 706 determines that an escalation policy should be triggered based on reported events.

In step 1204 an assistance recommendation unit 717 of the escalation policy activation unit 706 identifies one or more individuals that are knowledgeable about the problem or issue that triggered the activation of the escalation policy. The assistance recommendation unit 717 identifies individuals who are knowledgeable about the problem or issue using the proficiency ratings stored in the user proficiency databases 758. As noted above, this can include user proficiency static databases that that been populated with user proficiency ratings supplied by various system administrators, as well as one or more user proficiency databases that are updated over time based on user activity. Essentially, the assistance recommendation unit 717 locates those users who have the highest proficiency ratings relating to the issue or problem that triggered activation of the escalation policy.

In some embodiments, the assistance recommendation unit identifies only a single individual that is knowledgeable about the problem or issue that triggered the escalation policy. In some embodiments, step 1204 may involve identifying multiple individuals that are knowledgeable about the problem or issue that triggered the escalation policy. In that case, in an optional step 1206, the assistance recommendation unit 717 may generate a list of the knowledgeable individuals that is ordered based on the proficiency ratings to indicate which of the multiple individuals are likely the most knowledgeable about the problem or issue. This information is then passed to the notification transmittal unit 718.

In step 1208, the notification transmittal unit 718 notifies a client, system administrator or technician identified in the escalation policy as to the occurrence of the problem or issue. The notification transmittal unit 718 also sends information about the identified individual or individuals that are believed to be knowledgeable about the problem or issue to the client, system administrator or technician identified in the escalation policy. This could include the name of the individual(s) as well as contact information that will allow the client, system administrator or technician identified in the escalation policy to contact the identified individual(s) to request assistance in resolving or mitigating the problem or issue. The method 1200 then ends.

The present invention may be embodied in methods, apparatus, electronic devices, and/or computer program products. Accordingly, the invention may be embodied in hardware and/or in software (including firmware, resident software, micro-code, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object-oriented programming language, such as JavaScript, Java®, Swift or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 13:
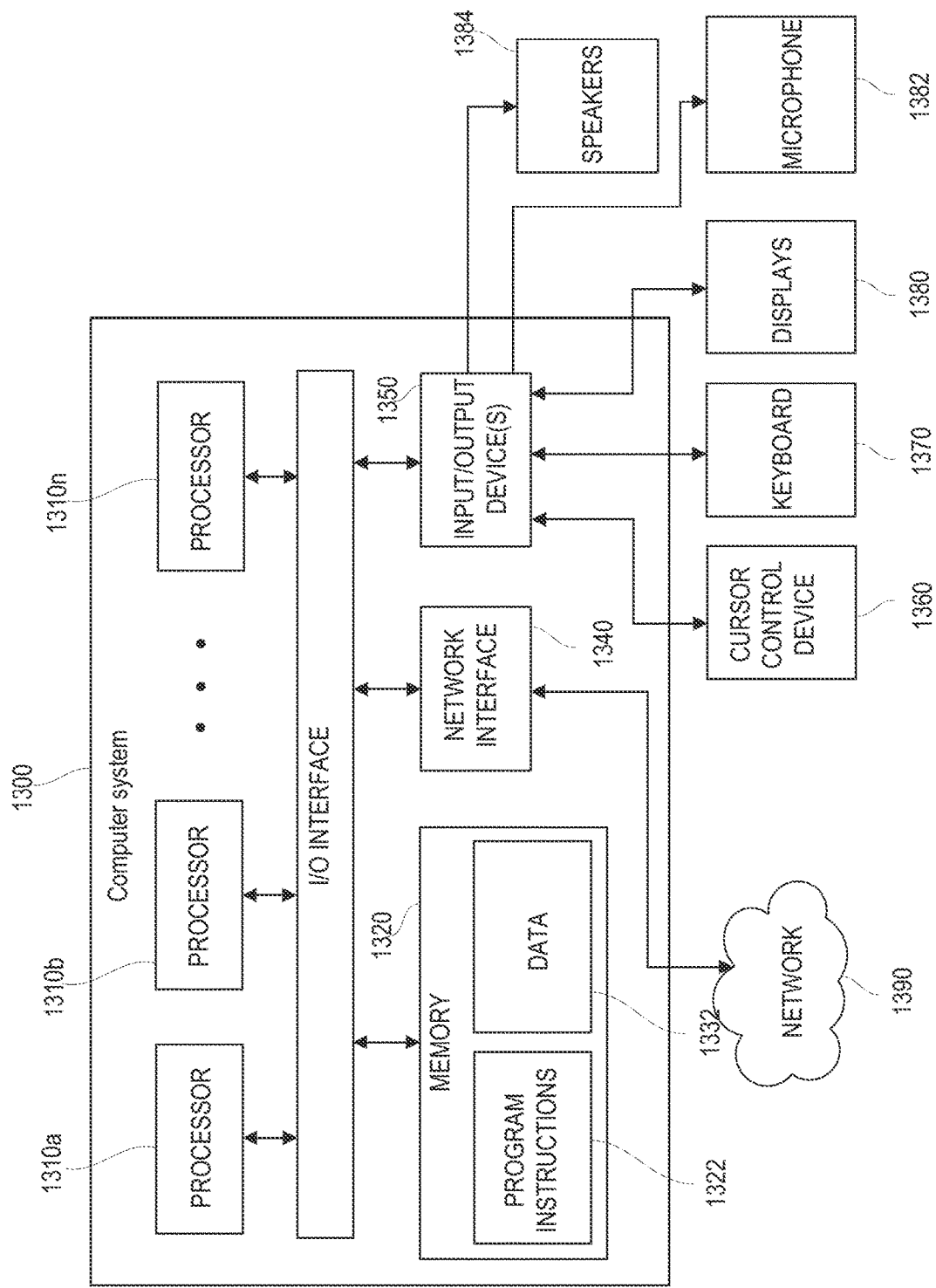
FIG. 13 illustrates elements of a computer system which can be used to implement systems and methods embodying the invention.

FIG. 13 depicts a computer system 1300 that can be utilized in various embodiments of the present invention to implement the invention according to one or more embodiments. The various embodiments as described herein may be executed on one or more computer systems, which may interact with various other devices. One such computer system is the computer system 1300 illustrated in FIG. 13. The computer system 1300 may be configured to implement the methods described above. The computer system 1300 may be used to implement any other system, device, element, functionality or method of the above-described embodiments. In the illustrated embodiments, the computer system 1300 may be configured to implement the disclosed methods as processor-executable executable program instructions 1322 (e.g., program instructions executable by processor(s) 1310) in various embodiments.

In the illustrated embodiment, computer system 1300 includes one or more processors 1310a-1310n coupled to a system memory 1320 via an input/output (I/O) interface 1330. Computer system 1300 further includes a network interface 1340 coupled to I/O interface 1330, and one or more input/output devices 1350, such as cursor control device 1360, keyboard 1370, display(s) 1380, microphone 1382 and speakers 1384. In various embodiments, any of the components may be utilized by the system to receive user input described above. In various embodiments, a user interface may be generated and displayed on display 1380. In some cases, it is contemplated that embodiments may be implemented using a single instance of computer system 1300, while in other embodiments multiple such systems, or multiple nodes making up computer system 1300, may be configured to host different portions or instances of various embodiments. For example, in one embodiment some elements may be implemented via one or more nodes of computer system 1300 that are distinct from those nodes implementing other elements. In another example, multiple nodes may implement computer system 1300 in a distributed manner.

In different embodiments, the computer system 1300 may be any of various types of devices, including, but not limited to, a personal computer system, desktop computer, laptop, notebook, or netbook computer, a portable computing device, a mainframe computer system, handheld computer, workstation, network computer, a smartphone, a camera, a set top box, a mobile device, a consumer device, video game console, handheld video game device, application server, storage device, a peripheral device such as a switch, modem, router, or in general any type of computing or electronic device.

In various embodiments, the computer system 1300 may be a uniprocessor system including one processor 1310, or a multiprocessor system including several processors 1310 (e.g., two, four, eight, or another suitable number). Processors 1310 may be any suitable processor capable of executing instructions. For example, in various embodiments processors 1310 may be general-purpose or embedded processors implementing any of a variety of instruction set architectures (ISAs). In multiprocessor systems, each of processors 1310 may commonly, but not necessarily, implement the same ISA.

System memory 1320 may be configured to store program instructions 1322 and/or data 1332 accessible by processor 1310. In various embodiments, system memory 1320 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 1320. In other embodiments, program instructions and/or data may be received, sent or stored upon different types of computer-accessible media or on similar media separate from system memory 1320 or computer system 1300.

In one embodiment, I/O interface 1330 may be configured to coordinate I/O traffic between processor 1310, system memory 1320, and any peripheral devices in the device, including network interface 1340 or other peripheral interfaces, such as input/output devices 1350. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 13020, may be incorporated directly into processor 1310.

Network interface 1340 may be configured to allow data to be exchanged between computer system 1300 and other devices attached to a network (e.g., network 1390), such as one or more external systems or between nodes of computer system 1300. In various embodiments, network 1390 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1340 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 1350 may, in some embodiments, include one or more display terminals, keyboards, keypads, touchpads, scanning devices, voice or optical recognition devices, or any other devices suitable for entering or accessing data by one or more computer systems 1300. Multiple input/output devices 1350 may be present in computer system 1300 or may be distributed on various nodes of computer system 1300. In some embodiments, similar input/output devices may be separate from computer system 1300 and may interact with one or more nodes of computer system 1300 through a wired or wireless connection, such as over network interface 1340.

In some embodiments, the illustrated computer system may implement any of the operations and methods described above, such as the methods illustrated by the flowcharts of FIGS. 9-12. In other embodiments, different elements and data may be included.

Those skilled in the art will appreciate that the computer system 1300 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 1300 may also be connected to other devices that are not illustrated, or instead ay operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1300 may be transmitted to computer system 1300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method performed by elements of a production environment assistant for alerting an individual as to the occurrence of a problem or issue within a monitored computer-based production environment, comprising:
    generating, for each of a plurality of users of the production environment assistant, proficiency scores that are indicative of the users' proficiency with respect to individual issue areas and/or production environment assistant features;
    storing the users' proficiency scores in a user proficiency database that includes a plurality of proficiency scores for each of the plurality of users;
    receiving a report indicating that an escalation policy was triggered due to the occurrence of a problem or issue within a computer-based production environment;
    identifying at least one person that is knowledgeable about the problem or issue that triggered the escalation policy by consulting the user proficiency database; and
    activating the escalation policy such that an individual identified in the escalation policy is notified of the problem or issue and a name and/or contact information for the at least one identified person that is knowledgeable about the problem or issue that triggered the escalation policy.

2. The method of claim 1, further comprising recording information about the interactions of the plurality of users with the production environment assistant, wherein the user's proficiency scores are generated based on the recorded information about the interactions of the plurality of users with the production environment assistant.

3. The method of claim 2, wherein recording information about the interactions of the plurality of users with the production environment assistant comprises:
    monitoring the plurality of users' interactions with a user interface of the production environment assistant; and
    recording information about the interactions of the plurality of users with the production environment assistant based on the monitored users' interactions with the user interface of the production environment assistant.

4. The method of claim 3, wherein recording information about the interactions of the plurality of users with the production environment assistant comprises recording how much time that each user spends interacting with each feature of the user interface.

5. The method of claim 4, wherein generating, for each of the plurality of users, proficiency scores that are indicative of the users' proficiency with respect to individual issue areas and/or production environment assistant features is based on the recorded amount of time that each user spends interacting with each feature of the user interface.

6. The method of claim 4, wherein generating, for each of the plurality of users, proficiency scores that are indicative of the users' proficiency with respect to individual issue areas and/or production environment assistant features is based on the percentage of each user's total interaction time that is spent interacting with each feature of the user interface.

7. The method of claim 1, wherein identifying at least one person that is knowledgeable about the problem or issue that triggered the escalation policy comprises identifying an individual that has the highest proficiency score for an issue area and/or production environment assistant feature that corresponds to the problem or issue that triggered the escalation policy.

8. The method of claim 1, wherein identifying at least one person that is knowledgeable about the problem or issue that triggered the escalation policy comprises identifying a plurality of individuals that have the highest proficiency scores for an issue area and/or production environment assistant feature that corresponds to the problem or issue that triggered the escalation policy.

9. The method of claim 8, wherein activating the escalation policy such that an individual identified in the escalation policy is notified of the problem or issue and a name and/or contact information for the at least one identified person that is knowledgeable about the problem or issue that triggered the escalation policy comprises:
  generating a list of the plurality of individuals that have the highest proficiency scores for an issue area and/or production environment assistant feature that corresponds to the problem or issue that triggered the escalation policy, wherein the list is ordered based on the proficiency scores of the users; and
  providing the ordered list of the plurality of individuals to the individual identified in the escalation policy.

10. A production environment assistant for alerting an individual as to the occurrence of a problem or issue within a monitored computer-based production environment, comprising:
  a memory; and
  one or more processors configured to perform a method comprising:
    generating, for each of a plurality of users of the production environment assistant, proficiency scores that are indicative of the users' proficiency with respect to individual issue areas and/or production environment assistant features;
    storing the users' proficiency scores in a user proficiency database that includes a plurality of proficiency scores for each of the plurality of users;
    receiving a report indicating that an escalation policy was triggered due to the occurrence of a problem or issue within a computer-based production environment;
    identifying at least one person that is knowledgeable about the problem or issue that triggered the escalation policy by consulting the user proficiency database; and
    activating the escalation policy such that an individual identified in the escalation policy is notified of the problem or issue and a name and/or contact information for the at least one identified person that is knowledgeable about the problem or issue that triggered the escalation policy.

11. The production environment assistant of claim 10, wherein the method performed by the one or more processors further comprises recording information about the interactions of the plurality of users with the production environment assistant, wherein the users' proficiency scores are generated based on the recorded information about the interactions of the plurality of users with the production environment assistant.

12. The production environment assistant of claim 11, wherein recording information about the interactions of the plurality of users with the production environment assistant comprises:
  monitoring the plurality of users' interactions with a user interface of the production environment assistant; and
  recording information about the interactions of the plurality of users with the production environment assistant based on the monitored users' interactions with the user interface of the production environment assistant.

13. The production environment assistant of claim 12, wherein recording information about the interactions of the plurality of users with the production environment assistant comprises recording how much time that each user spends interacting with each feature of the user interface.

14. The production environment assistant of claim 13, wherein generating, for each of the plurality of users, proficiency scores that are indicative of the users' proficiency with respect to individual issue areas and/or production environment assistant features is based on the recorded amount of time that each user spends interacting with each feature of the user interface.

15. The production environment assistant of claim 13, wherein generating, for each of the plurality of users, proficiency scores that are indicative of the users' proficiency with respect to individual issue areas and/or production environment assistant features is based on the percentage of each user's total interaction time that is spent interacting with each feature of the user interface.

16. The production environment assistant of claim 10, wherein identifying at least one person that is knowledgeable about the problem or issue that triggered the escalation policy comprises identifying an individual that has the highest proficiency score for an issue area and/or production environment assistant feature that corresponds to the problem or issue that triggered the escalation policy.

17. The production environment assistant of claim 10, wherein identifying at least one person that is knowledgeable about the problem or issue that triggered the escalation policy comprises identifying a plurality of individuals that have the highest proficiency scores for an issue area and/or production environment assistant feature that corresponds to the problem or issue that triggered the escalation policy.

18. The production environment assistant of claim 17, wherein activating the escalation policy such that an individual identified in the escalation policy is notified of the problem or issue and a name and/or contact information for the at least one identified person that is knowledgeable about the problem or issue that triggered the escalation policy comprises:
  generating a list of the plurality of individuals that have the highest proficiency scores for an issue area and/or production environment assistant feature that corresponds to the problem or issue that triggered the escalation policy, wherein the list is ordered based on the proficiency scores of the users; and
  providing the ordered list of the plurality of individuals to the individual identified in the escalation policy.

* * * * *